(12) United States Patent
Raith

(10) Patent No.: US 6,795,425 B1
(45) Date of Patent: Sep. 21, 2004

(54) WIRELESS COMMUNICATIONS METHODS AND APPARATUS EMPLOYING PAGING ATTRIBUTE DESCRIPTORS

(75) Inventor: Alex Krister Raith, San Diego, CA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/434,064

(22) Filed: Nov. 5, 1999

Related U.S. Application Data

(60) Provisional application No. 60/108,151, filed on Nov. 12, 1998.

(51) Int. Cl.⁷ .................................................. H04J 3/00
(52) U.S. Cl. ........................ 370/345; 370/321; 370/328; 455/424; 455/458
(58) Field of Search ................................ 455/424, 426, 455/458, 466, 338, 12.1, 13.2; 370/328, 329, 337, 345, 347, 321, 324, 312, 338; 340/7.43, 7.51, 7.55, 825.2, 825.14

(56) References Cited

U.S. PATENT DOCUMENTS

| | | | |
|---|---|---|---|
| 5,404,355 A | | 4/1995 | Raith .......................... 370/95.1 |
| 5,546,394 A | * | 8/1996 | Eaton et al. .................. 340/7.3 |
| 5,570,467 A | * | 10/1996 | Sawyer ........................ 455/515 |
| 5,604,744 A | * | 2/1997 | Andersson et al. .......... 370/347 |
| 5,629,940 A | * | 5/1997 | Gaskill ........................ 370/311 |
| 5,640,395 A | * | 6/1997 | Hamalainen et al. ....... 370/322 |
| 5,778,316 A | | 7/1998 | Persson et al. .............. 455/434 |
| 5,910,949 A | * | 6/1999 | Bilstrom et al. ............. 370/337 |
| 5,982,294 A | * | 11/1999 | Takayama et al. .......... 340/7.44 |
| 6,044,069 A | * | 3/2000 | Wan ............................ 340/7.34 |
| 6,069,886 A | * | 5/2000 | Ayerst et al. ................ 370/336 |
| 6,212,176 B1 | * | 4/2001 | Andersson et al. .......... 370/347 |
| 6,215,980 B1 | * | 4/2001 | Kim ............................. 455/91 |
| 6,240,288 B1 | * | 5/2001 | Wan et al. ................... 455/426 |
| 6,339,588 B1 | * | 1/2002 | Katsuragawa ............... 370/311 |
| 6,363,055 B1 | * | 3/2002 | Sasson ........................ 370/252 |
| 6,377,161 B1 | * | 4/2002 | Gromelski et al. .......... 340/7.2 |
| 6,411,613 B1 | * | 6/2002 | Seymour et al. ............ 370/347 |
| 6,414,945 B1 | * | 7/2002 | Chennakeshu et al. ..... 370/317 |
| 6,421,540 B1 | * | 7/2002 | Gilhousen et al. .......... 455/458 |
| 6,477,382 B1 | * | 11/2002 | Mansfield et al. .......... 455/458 |
| 6,560,439 B1 | * | 5/2003 | Grayson ..................... 455/12.1 |

FOREIGN PATENT DOCUMENTS

| | | | | |
|---|---|---|---|---|
| WO | WO 91/11868 | * | 8/1991 | ............ H04J/3/26 |
| WO | WO 95/12931 | * | 5/1995 | ............ H04J/3/26 |
| WO | WO-9641493 | * | 12/1996 | ............ H04Q/7/38 |

OTHER PUBLICATIONS

International Search Report, PCT/US99/26416, Feb. 17, 2000.

* cited by examiner

*Primary Examiner*—Charles Appiah
*Assistant Examiner*—Khawar Iqbal
(74) *Attorney, Agent, or Firm*—Myers Bigel Sibley & Sajovec, PA

(57) ABSTRACT

A paging attribute descriptor (PAD) the indicates content of a page message is transmitted in a first time slot and/or a succeeding second time slot of a physical channel, and the page message is transmitted in the second time slot. The second slot may be, for example, a Digital Control Channel (DCCH) slot mapped on a physical channel (DTCH) of an IS-136 system. The transmitted PAD is recovered at wireless station, which then determines whether to recover the page message based on the recovered PAD, e.g., if the PAD indicates that the page message is an empty page message, a page message addressed to another wireless station or a page message that includes control information that has changed. For example, in an IS-136 compliant system, the PAD may be transmitted in the coded superframe phase (CSFP) field of a Paging Channel (PCH) message transmitted in a Digital Control Channel (DCCH) slot, or in reserved bits of a slot preceding a PCH message.

30 Claims, 18 Drawing Sheets

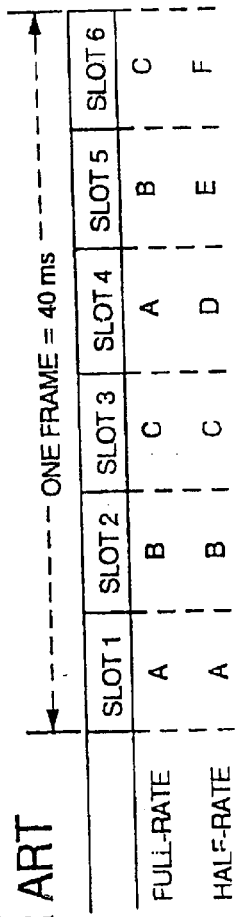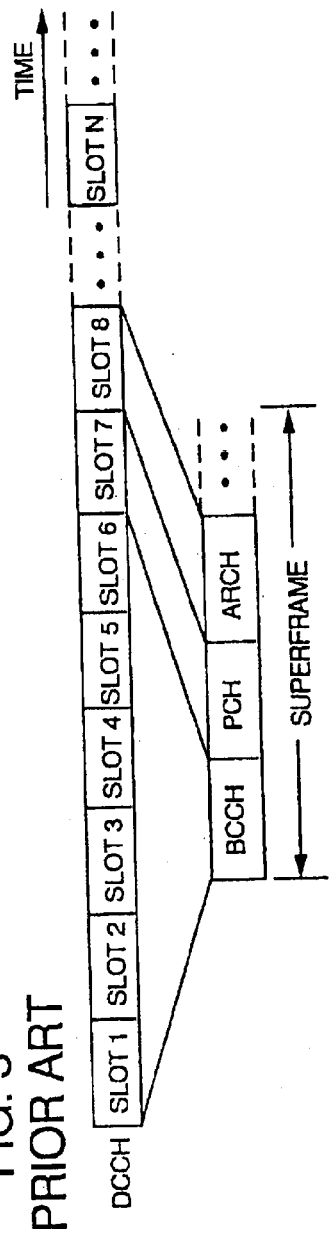
FIG. 2 PRIOR ART
FIG. 3 PRIOR ART
FIG. 5
FIG. 7

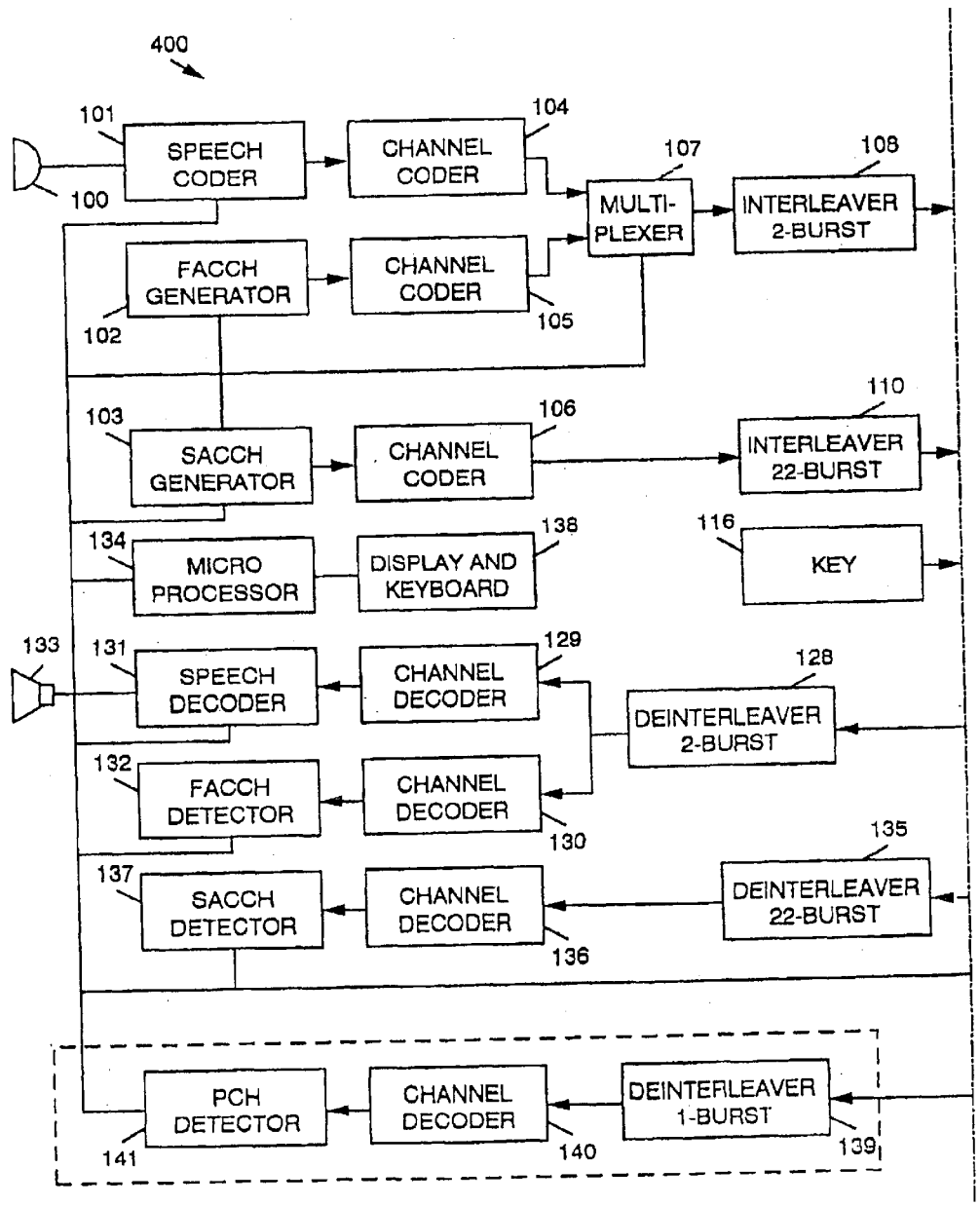

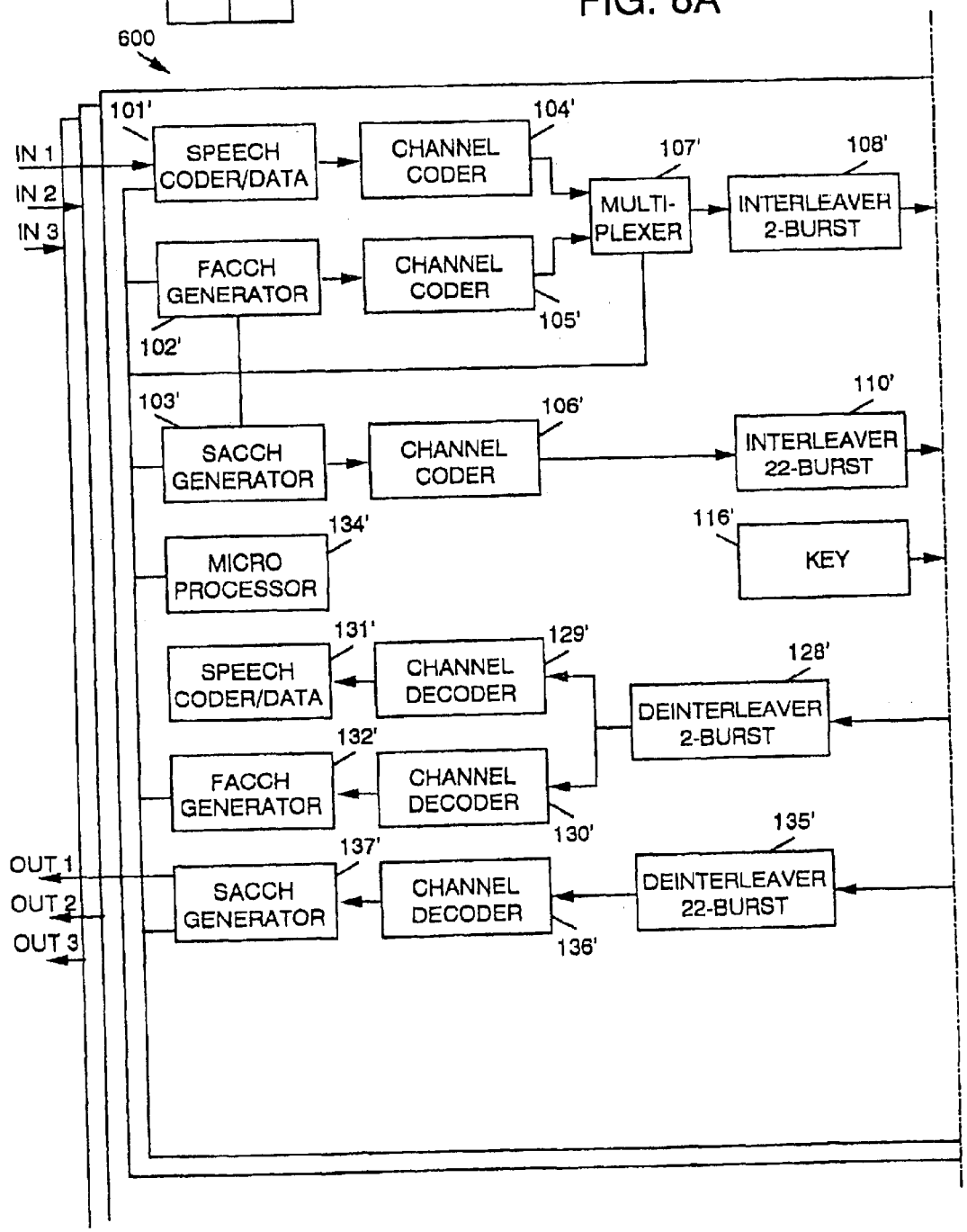

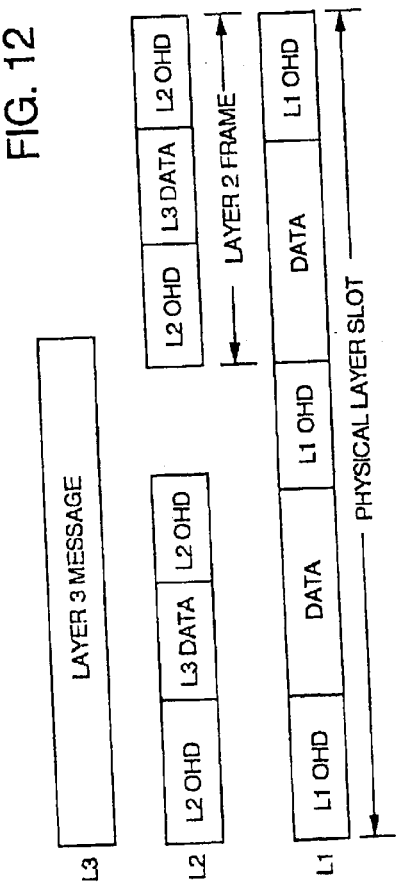

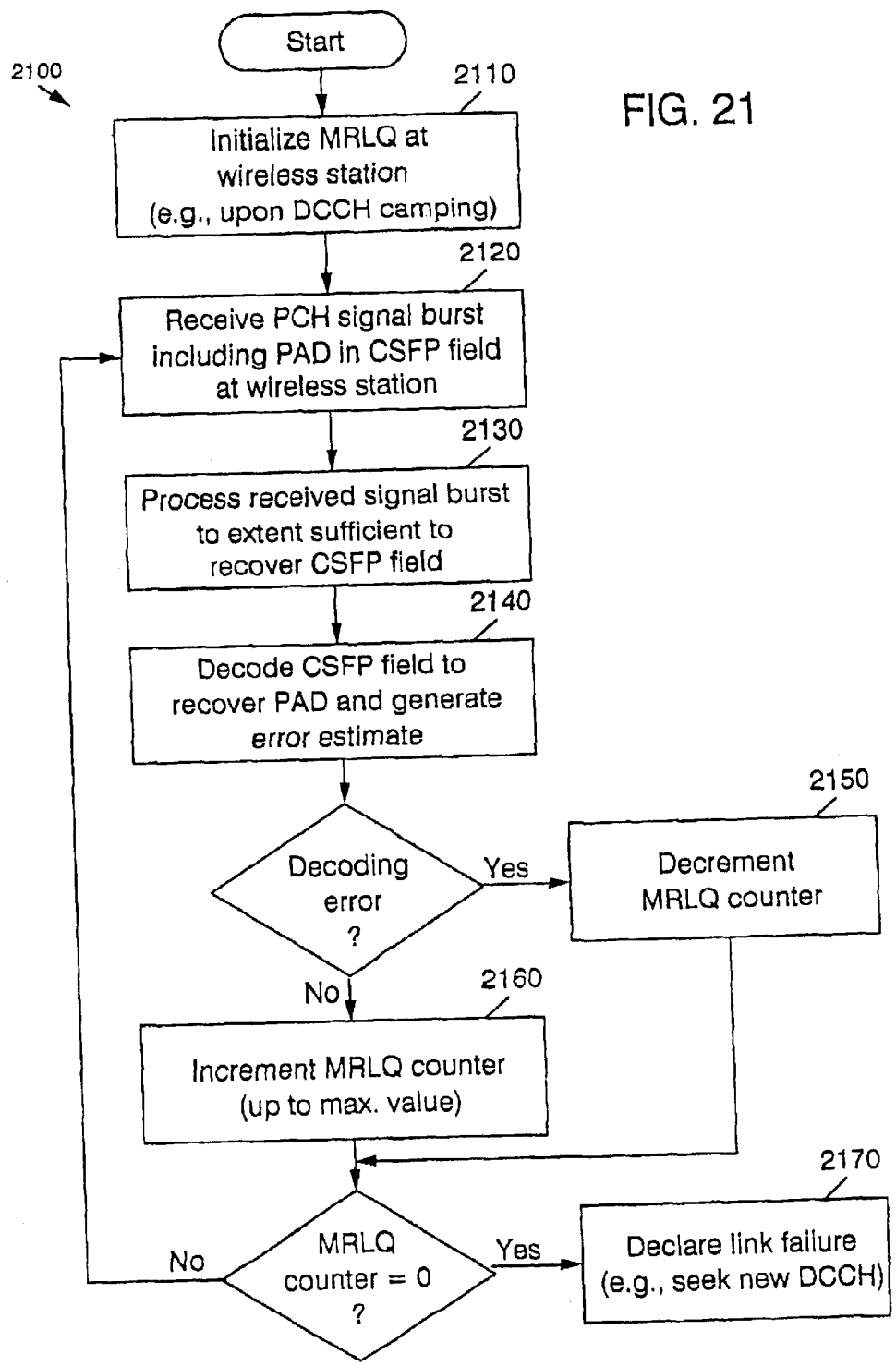

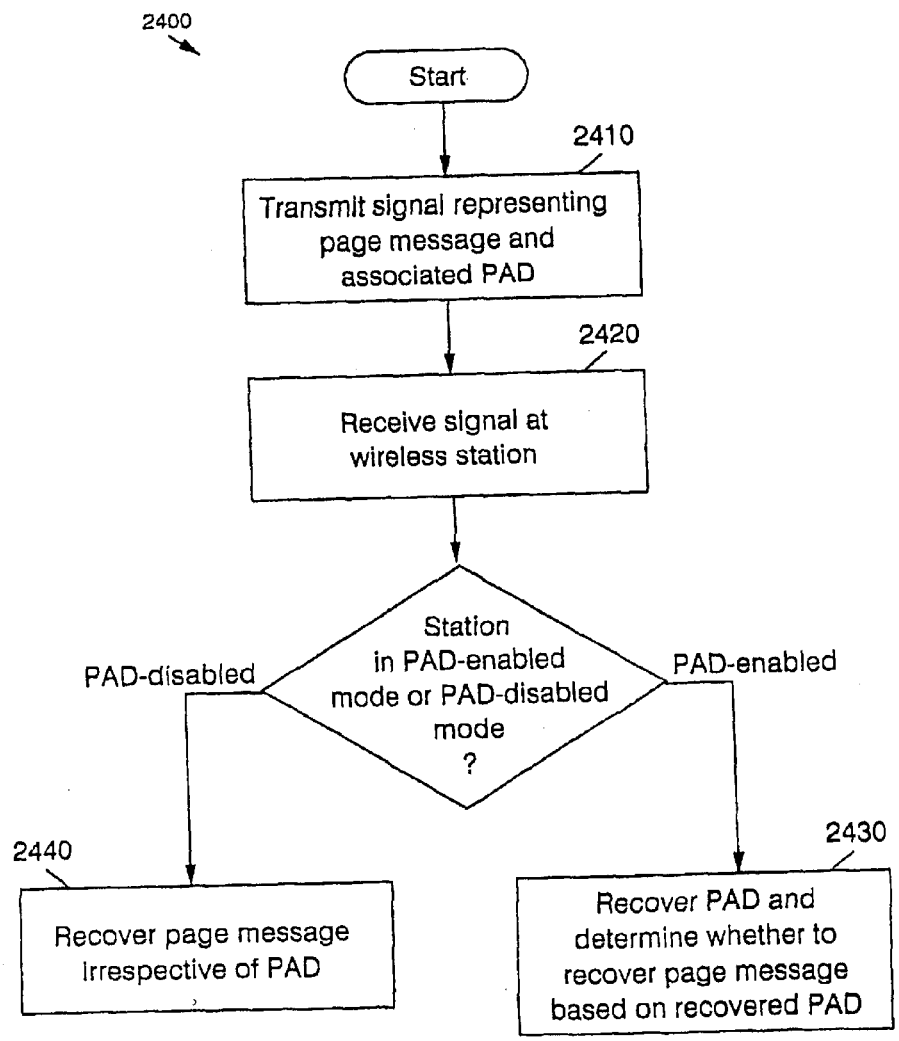

WIRELESS COMMUNICATIONS METHODS AND APPARATUS EMPLOYING PAGING ATTRIBUTE DESCRIPTORS

RELATED APPLICATIONS

This application claims the benefit of U.S. Provisional Application No. 60/108,151 filed Nov. 12, 1998, the disclosure of which is incorporated herein by reference in its entirety

BACKGROUND OF THE INVENTION

The present invention relates to wireless communication systems and, more particularly, to methods and apparatus for communicating control information in wireless communications systems.

Cellular radio systems have been operating in the United States since the early 1980s. In a typical cellular radio system as shown in FIG. 1, a geographical area (e.g., a metropolitan area) is divided into several smaller, contiguous radio coverage areas (called "cells") such as cells C1–C10. The cells C1–C10 are served by a corresponding group of fixed radio stations (called "base stations") B1–B10, each of which operates on a subset of the radio frequency (RF) channels assigned to the system. The RF channels allocated to any given cell may be reallocated to a distant cell in accordance with a frequency reuse pattern as is well known in the art. The cellular telephone users (mobile station subscribers) in the cells C1–C10 are provided with portable (hand-held), transportable (hand-carried) or mobile (car-mounted) wireless stations, such as mobile stations M1–M9, each of which communicates with a nearby base station. The base stations B1–B10 are connected to and controlled by a mobile station services switching center (MSC) 20. The MSC 20, in turn, is connected to a central office (not shown in FIG. 1) in the landline (wireline) public switched telephone network (PSTN) or to a similar facility such as an integrated system digital network (ISDN). The MSC 20 switches calls between and among wireline and mobile station subscribers, controls signaling to the mobile stations, compiles billing statistics, and provides for the operation, maintenance and testing of the system.

In each cell, at least one RF channel (called the "control" or "paging/access" channel) is used to carry control or supervisory messages, and the other RF channels (e.g., the "voice" or "speech" channels) are used to carry voice conversations. When turned on (powered up), each of the mobile stations M1–M9 enters the idle state (standby mode) and tunes to and continuously monitors the strongest control channel (generally, the control channel of the cell in which the mobile station is located at that moment).

To detect incoming calls, the mobile station continuously monitors the control channel to determine whether a page message addressed to it (ie., containing its MIN) has been received. A page message will be sent to the mobile station, for example, when an ordinary (landline) subscriber calls the mobile station subscriber. The call is directed from the PSTN to the MSC 20 where the dialed number is analyzed. If the dialed number is validated, the MSC 20 requests some or all of the base stations B1–B10 to page the called mobile station throughout their corresponding cells C1–C10. Each of the base stations B1–B10 which receive the request from the MSC 20 will then transmit over the control channel of the corresponding cell a page message containing the MIN of the called mobile station. Each of the idle mobile stations M1–M9 which is present in that cell will compare the MIN in the page message received over the control channel with the MIN stored in the mobile station. The called mobile station with the matching MIN will automatically transmit a page response over the control channel to the base station which then forwards the page response to the MSC 20. Upon receiving the page response, the MSC 20 selects an available voice channel in the cell from which the page response was received (the MSC 20 maintains an idle channel list for this purpose), and requests the base station in that cell to order the mobile station via the control channel to tune to the selected voice channel. A through-connection is established once the mobile station has tuned to the selected voice channel.

FIG. 3 shows an exemplary DCCH superframe which includes at least three logical channels, namely, a broadcast control channel (BCCH), a paging channel (PCH), and an access response channel (ARCH). The BCCH, which in this example is allocated 6 DCCH slots, carries overhead messages. The PCH, which is allocated one DCCH slot, carries page messages. The ARCH, which is also allocated one DCCH slot, carries voice or speech channel assignment messages. The exemplary superframe of FIG. 3 may contain other logical channels, including additional paging channels (if more than one PCH is defined, different groups of mobile stations may be assigned to different PCHs).

A mobile station operating on the DCCH of FIG. 3 need only be "awake" (monitoring) during certain time slots (e.g., the BCCH and its assigned PCH) in each superframe and can enter "sleep mode" at all other times. While in sleep mode, the mobile station turns off most internal circuitry and saves battery power. Furthermore, by configuring the BCCH as taught in U.S. Pat. No. 5,404,355 to Raith, the mobile station can read (i.e., decode) the overhead messages when locking onto the DCC (e.g., at power-up) and thereafter only when the information has changed, thus resulting in additional battery power savings while allowing for fast cell selection.

Typically only a fraction of the page messages received over the PCH will be directed to the mobile station, as most messages will either be empty messages ("filler" messages containing no page) or pages to other mobile stations. The PCH will usually be operated substantially below the capacity limit in order to avoid excessive traffic blocking (and, hence, delay in delivering pages to the mobile stations). If blocking problems do develop (e.g., because of unanticipated demand) in any cell, the operator can assign additional control channels in that cell or use other capacity-enhancing techniques such as cell splitting. Thus, in general, an appropriately-managed PCH typically will be operated at a level far below maximum capacity, even at busy times. Consequently, more often than not, the PCH carries empty messages. Furthermore, since a mobile station usually receives no more than a few calls each day, most of the non-empty page messages sent on the PCH will be for other mobile stations.

To maximize sleep mode efficiency, the mobile station should be able to detect whether the received page messages are relevant messages (e.g., page messages directed to this particular mobile station) or irrelevant messages (e.g., empty page messages or page messages directed to other mobile stations) as early as possible in the receive processing (e.g., after demodulation but before decoding) so as to avoid as many signal processing steps as possible. Once an irrelevant page is detected, the mobile station can immediately return to sleep. To appreciate the possible power savings from an early detection of irrelevant pages, consider a typical PCH in which a page message is sent once per second. This means that there are (60*60*24=) 86,400 page messages sent to the mobile station each day. If, for example, the PCH carries non-empty page messages only 10% of the time, the mobile station can avoid processing 90% of the page messages if it can detect empty pages. Furthermore, if only a few of the non-empty page messages are directed to this mobile station, it can avoid processing almost all of the page messages transmitted on the PCH if it can also detect that the other non-empty page messages are directed to other mobile stations. Thus, the mobile station effectively can be in sleep mode during PCH reception.

The aforementioned U.S. Pat. No. 5,404,355 describes a technique of grouping information elements and providing an indicator whether the mobile station shall read the associated information elements. This technique is used in current IS-136 to inform the mobile stations about new or changed overhead information. In the PCH channel, change flags are provided to indicate the mobile station to read the overhead information and end-user broadcast messages respectively. Within the broadcast channel (BCCH), change flags are provided for to indicate changes, amendments or deletions of the sub-partitioned the BCCH channel.

Similarly, the TIA contribution TR45.5.3.1/98.07.14.13 describes a proposed new channel (F-QPCH) which indicates whether the mobile station shall read it's assigned sleep mode slot in which there may be pages or overhead information. Each mobile stations is assigned a particular F-QPCH based on it's identity. Only new mobile stations (designed with the knowledge of the F-QPCH channel) can make benefit of the power savings. Furthermore, in interest of backward compatibility, the F-QPCH channel may have to be introduced on a different control channel then the control channel serving old mobile stations.

U.S. Pat. No. 5,930,706 to Raith describes a technique which can save the mobile station battery power while camped on a control channel. The mobile station re-encodes the format (bit-pattern) of an empty page and compares it with the received page messages before channel decoding. Since there is lots of redundancy in an empty page, the comparison of the stored vector and the received vector can be safely accomplished just using a small fraction of the transmitted data. If the mobile station determines that the received data is an empty page the mobile station stops further processing. In a refined mode of operation, the mobile station re-encodes its paging number (the data used to contact the mobile station e.g. IMSI/MIN/TMSI) and compares the incoming data with the pre-stored data. For example, in the GSM system which interleaves the Paging channel over 4 non-consecutive time slots, the mobile station will most often be able to make a determination whether it shall examine the contents in the Paging channel after having received just one of the four time slots. In TIA/EIA IS-95,the paging slot is rather long (80 ms) and the use of this technique would allow the mobile station to power down, when there is no page present, in a much shorter time. In contrast to the proposal in TR45.5.3.1/98.07.14.13 this technique can be applied to any existing wireless system and does not require any new protocols on the control channel. Furthermore, old and new mobile stations for a given system need not be segregated to different control channels. However, because of possible multiple mobile station identity types and PCH messages that can contain multiple pages the implementation of this method must first be simulated in off-line computer in order for the mobile station not making erroneous decision.

SUMMARY OF THE INVENTION

According to embodiments of the present invention, a paging attribute descriptor (PAD) the indicates content of a page message is transmitted in a first time slot and/or a succeeding second time slot of a physical channel, and the page message is transmitted in the second time slot. The second slot may be, for example, a Digital Control Channel (DCCH) slot mapped on a physical channel (DTCH) of an IS-136 system. The transmitted PAD is recovered at wireless station, which then determines whether to recover the page message based on the recovered PAD, e.g., if the PAD indicates that the page message is an empty page message, a page message addressed to another wireless station or a page message that includes control information that has changed. For example, in an IS-136 compliant system, the PAD may be transmitted in the coded superframe phase (CSFP) field of a Paging Channel (PCH) message transmitted in a Digital Control Channel (DCCH) slot, or in reserved bits of a slot preceding a PCH message.

The present invention arises from the realization that power savings in addition to those provided by conventional sleep mode operations and other conventional power-saving techniques may be achieved by using a paging attribute descriptor (PAD) that can be quickly read and used to determine whether to fully process page messages. The PAD may be incorporated within existing control channel structures such that major modification of wireless communications protocols is not required, and such that existing features, such as existing page message control flags, can still be supported. In addition, the PAD feature be implemented such that new generation wireless stations (e.g., cellular telephones) can enjoy the advantages of using the PAD feature while compatibility with older terminal designs is maintained. In embodiments described herein, this may be achieved by mapping a PAD channel onto existing fields in Paging Channel (PCH) messages and/or Digital Control Channel (DCCH) messages, and by structuring the PAD to support page message control flags and modified link quality monitoring techniques.

According to an embodiment of the present invention, in a wireless communications system that is operative to communicate over a physical channel defined as a series of repeating time slots, a paging attribute descriptor (PAD) is transmitted in at least one of a first time slot of the physical channel and a second time slot of the physical channel succeeding the first time slot, the PAD indicating content of a page message. The page message is transmitted in the second time slot. The PAD at a wireless station, which determining whether to recover the page message based on the recovered PAD. Preferably, the wireless station recovers the page message if the recovered PAD meets a predetermined criterion and foregoes recovery of the page message if the recovered PAD fails to meet the predetermined criterion.

In one embodiment of the present invention, a signal including the PAD is transmitted in a time slot assigned to a paging channel. The signal is received at the wireless station, and demodulated to an extent sufficient to recover the PAD. The wireless station foregoes further demodulation of the received signal if the recovered PAD meets a predetermined criterion.

In another embodiment, a signal burst representing the page message and the PAD is transmitted in a Digital Control Channel (DCCH) time slot assigned to a Paging Channel (PCH). The signal burst is received at the wireless station, and processed to recover the PAD. The signal burst may represent a physical layer message including a Coded Super Frame Phase (CSFP) field including the PAD. In another embodiment, a similar technique is used to transmit a PAD in a Packet data Control Channel (PCCH) time slot assigned to a Paging Channel (PCH), more particularly, in a Coded Data Frame Type (CDFT) field.

In yet another embodiment of the present invention, a first signal burst representing the PAD is transmitted in a time slot preceding a DCCH time slot assigned to a Paging Channel (PCH). A second signal burst representing the page message is transmitted in the DCCH time slot assigned to the PCH. The second signal burst may be sufficiently processed at the wireless station to recover synchronization information, which is then used to process the first signal burst to recover the PAD. The wireless station may then determine whether to further process the second signal burst to recover the page message based on the recovered PAD. According to yet another aspect of the present invention, a transmitted PAD includes one of a plurality of group values, a respective one of the group values associated with a respective group of wireless stations. This group value may be recovered at a receiving wireless station, which recovers the page message if the recovered group value is associated with a group of wireless stations of which the wireless station is a member.

In another embodiment of the present invention, a transmitted PAD includes a flag indicating status of control information included in a page message. This flag may be recovered at the wireless station, which determines whether to recover the associated page message based on the recovered flag.

According to still another aspect of the present invention, a decision whether to recover a page message at a wireless station based on a recovered PAD is biased towards one of recovering the page message or foregoing recovery of the page message. For example, the wireless station may bias the decision whether to recover a page message based on a recovered PAD associated with the page message more towards recovering the page message than foregoing recovery of the page message, as missing a page message that is actually intended for the wireless station may have more significant negative consequences than unnecessarily reading a page. The biasing may be based, for example, on channel quality.

In still another embodiment of the present invention, a wireless station may operate in first and second modes in which it process PADs differently. The wireless station may recover a transmitted page message at the wireless station if the associated PAD meets a predetermined criterion and the wireless station is in the first mode. However, if the wireless station is in the second mode, it may recover the transmitted page message irrespective of the recovered PAD.

According to another aspect of the present invention, a wireless station includes a receiver that recovers a transmitted paging attribute descriptor (PAD) from at least one of a first time slot of a physical channel defined as a series of repeating time slots and a second time slot of the physical channel succeeding the first time slot, the PAD indicating content of a page message transmitted in the second time slot, and that determines whether to recover the page message based on the recovered PAD. The receiver may be operative to recover the page message if the recovered PAD meets a predetermined criterion and to forego recovery of the page message if the recovered PAD fails to meet the predetermined criterion.

According to yet another aspect of the present invention, a wireless communications system includes a base station that transmits a paging attribute descriptor (PAD) in at least one of a first time slot of a physical channel comprising a series of repeating time slots and a second time slot of the physical channel succeeding the first time slot, the PAD indicating content of a page message, and that transmits the page message in the second time slot. The PAD may be transmitted, for example, in a CSFP field of a PCH page message transmitted in a DCCH slot and/or in a slot preceding this DCCH slot.

BRIEF DESCRIPTION OF THE DRAWINGS

FIG. 2 illustrates a physical channel structure for a time division multiple access (TDMA) wireless communications system.

FIG. 3 illustrates an exemplary superframe structure for a Digital Control Channel (DCCH) defined over the TDM RF channel shown in FIG. 2.

FIG. 5 illustrates an exemplary IS-54B compatible slot format for time division multiple access (TDMA) transmissions from the mobile station of FIG. 4.

FIG. 7 illustrates an exemplary IS-54B compatible slot format for TDM transmissions from the base station of FIG. 6.

FIG. 12 illustrates exemplary operations for mapping of Layer 3 (L3) messages into TDM/TDMA slots in accordance with the IS-136 standard.

FIG. 13 illustrates an exemplary format for a L2 frame which may be used for transmitting an empty page message in accordance with the IS-136 standard.

FIG. 14 illustrates an exemplary format for a L2 frame which may be used for transmitting a non-empty page message in accordance with the IS-136 standard.

FIG. 15 illustrates a message header for use in L2 frames as illustrated in FIGS. 13–14.

FIGS. 17–24 are flowchart illustrations of exemplary operations for providing a paging attribute descriptor (PAD) channel according to embodiments of the present invention.

DETAILED DESCRIPTION

Figure 1:
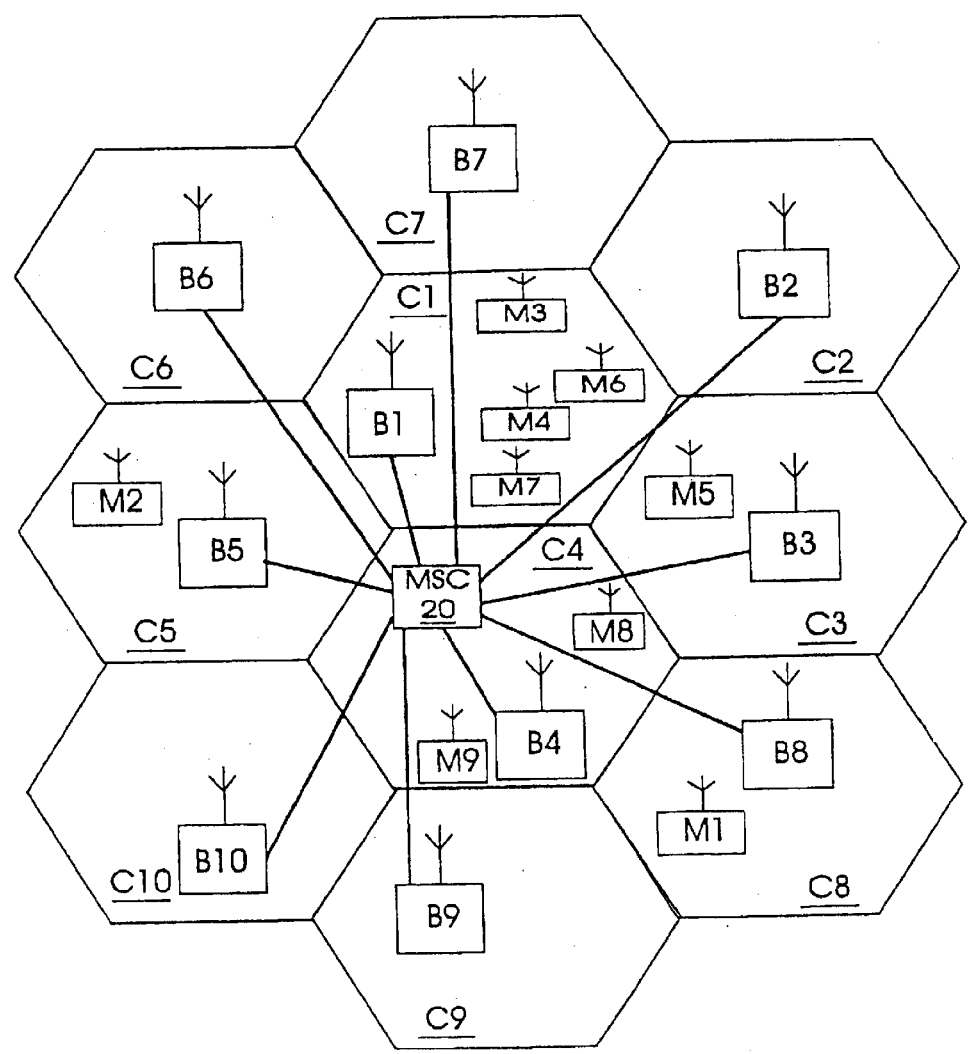
FIG. 1 illustrates a conventional cellular radio system.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

The following description is written in terms of a cellular radiotelephone system, but it will be understood that the present invention is not limited to that environment. Also, the following description is written in the context of time division multiple access (TDMA) cellular communication systems, but it will be understood by those skilled in the art that the present invention is applicable to systems using other access techniques, e.g., in code division multiple access (CDMA) systems such as those conforming to the IS-95 standard.

A Exemplary Environment

In a conventional cellular radio system as shown in FIG. 1, a geographical area (e.g., a metropolitan area) is divided into several smaller, contiguous radio coverage areas (called "cells") such as cells C1–C10. The cells C1–C10 are served by a corresponding group of fixed radio stations (called "base stations") B1–B10, each of which operates on a subset of the radio frequency (RF) channels assigned to the system. The RF channels allocated to any given cell may be reallocated to a distant cell in accordance with a frequency reuse pattern as is well known in the art. In each cell, at least one RF channel (called the "control" or "paging/access" channel) is used to carry control or supervisory messages, and the other RF channels (called the "voice" or "speech" channels) are used to carry voice conversations. The cellular telephone users (mobile subscribers) in the cells C1–C10 are provided with portable (hand-held), transportable (hand-carried) or mobile (car-mounted) telephone units (wireless terminals) such as wireless terminals M1–M9, each of which communicates with a nearby base station. The base stations B1–B10 are connected to and controlled by a Mobile services Switching Center (MSC) 20. The MSC 20, in turn, is connected to a central office (not shown in FIG. 1) in the landline (wireline) Public Switched Telephone Network (PSTN) or to a similar facility such as an Integrated System Digital Network (ISDN). The MSC 20 switches calls between and among wireline and mobile subscribers, controls signaling to the wireless terminals, compiles billing statistics, and provides for the operation, maintenance and testing of the system.

When turned on (powered up), each of the wireless terminals M1–M9 enters the idle state (standby mode) and tunes to and continuously monitors the strongest control channel (generally, the control channel of the cell in which the wireless terminal is located at that moment).

To detect incoming calls, the wireless terminal continuously monitors the control channel to determine whether a page message addressed to it (i e., containing its MIN) has been received. A page message will be sent to the wireless terminal, for example, when an ordinary (landline) subscriber calls the mobile subscriber. The call is directed from the PSTN to the MSC 20 where the dialed number is analyzed. If the dialed number is validated, the MSC 20 requests some or all of the base stations B1–B10 to page the called wireless terminal throughout their corresponding cells C1–C10. Each of the base stations B1–B10 which receive the request from the MSC 20 will then transmit over the control channel of the corresponding cell a page message containing the MIN of the called wireless terminal. Each of the idle wireless terminals M1–M9 which is present in that cell will compare the MIN in the page message received over the control channel with the MIN stored in the wireless terminal. The called wireless terminal with the matching MIN will automatically transmit a page response over the control channel to the base station which then forwards the page response to the MSC 20. Upon receiving the page response, the MSC 20 selects an available voice channel in the cell from which the page response was received (the MSC 20 maintains an idle channel list for this purpose), and requests the base station in that cell to order the wireless terminal via the control channel to tune to the selected voice channel. A through-connection is established once the wireless terminal has tuned to the selected voice channel.

FIG. 3 shows an exemplary DCCH superframe which includes at least three logical channels, namely, a Broadcast Control CHannel (BCCH), a Paging CHannel (PCH), and an Access Response CHannel (ARCH). The BCCH, which in this example is allocated 6 DCCH slots, carries overhead messages. The PCH, which is allocated one DCCH slot, carries page messages. The ARCH, which is also allocated one DCCH slot, carries voice or speech channel assignment messages. The exemplary superframe of FIG. 3 may contain other logical channels, including additional paging channels (if more than one PCH is defined, different groups of wireless terminals may be assigned to different PCHs). A wireless terminal operating on the DCCH of FIG. 3 need only be "awake" (monitoring) during certain time slots (e.g., the BCCH and its assigned PCH) in each superframe and can enter "sleep mode" at all other times. While in sleep mode, the wireless terminal can turn off most internal circuitry and can save battery power. Furthermore, by configuring the BCCH as taught in U.S. Pat. No. 5,404,355 to Raith, the disclosure of which is hereby incorporated herein by reference in its entirety, the wireless terminal can read (i.e., decode) the overhead messages when locking onto the DCCH (e.g., at power-up) and thereafter only when the information has changed, thus allowing additional battery power savings while allowing for fast cell selection.

Figure 4B:
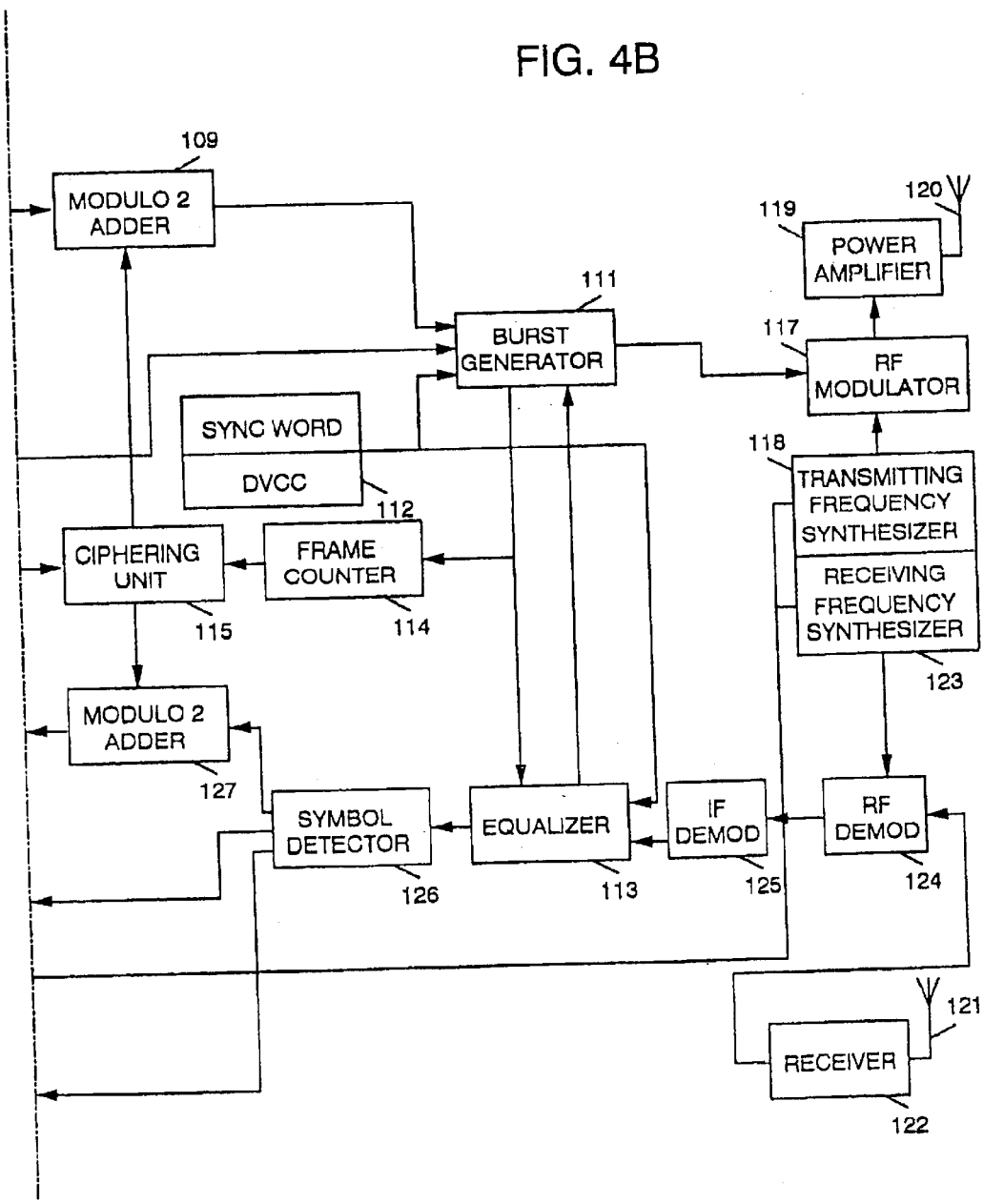
FIG. 4 is a block diagram illustrating an exemplary mobile station which may be used in accordance with embodiments of the present invention.

Referring now to FIG. 4, there is shown a block diagram of an exemplary wireless terminal 400 including components which may be used in accordance with the present invention. In FIG. 4, certain components which are relevant to communications over digital channels are shown, but it will be appreciated that other digital or analog components may be used in addition to or in place of some of these components. The exemplary wireless terminal 400 of FIG. 4 can transmit and receive speech and control data. The transmit circuitry is generally depicted in the upper half of FIG. 4 while the receive circuitry is generally depicted in the lower half of FIG. 4.

In the wireless terminal 400 of FIG. 4, speech from the user is detected as an analog voice signal by a microphone 100 and then passed through one or more voice processing stages (not shown in FIG. 4) before being provided as input to a speech coder 101. The pre-coding voice processing stages may include audio level adjustment, bandpass filtering and analog-to-digital conversion (e.g., 13-bit PCM format or 8-bit &law format) followed by additional high-pass filtering. The speech coder 101 uses a voice compression algorithm (e.g., ACELP or VSELP) to compress the voice signal into a low-rate data bit stream (e.g., from 64 kbps to 8 kbps). The output of the speech coder 101 is fed to a channel coder 104 which applies one or more error protection and/or correction techniques to the data stream. For example, the channel coder 104 may use a rate one-half convolution code to protect the more vulnerable bits of the speech coder data stream. The channel coder 104 may also use a Cyclic Redundancy Check (CRC) over some of the most perceptually significant bits of the speech coder frame.

Referring again to FIG. 4, control data is generated in the wireless terminal 400 in a Fast Associated Control CHannel (FACCH) generator 102 and a Slow Associated Control CHannel (SACCH) generator 103, and error-coded in channel coders 105 and 106, respectively. FACCH messages are transmitted in a blank and burst mode whereby a burst of speech data is blanked and replaced with a high-rate FACCH burst. By contrast, SACCH messages are continuously transmitted at a slower rate along with each burst of speech data. In the exemplary embodiment shown in FIG. 4, SACCH messages are fed to a 22-burst interleaver 110 which spreads the SACCH data over 22 time slots prior to transmission.

With continuing reference to FIG. 4, the coded speech bits from the channel coder 104 and the coded FACCH messages from the channel coder 105 are provided to respective inputs of a time division multiplexer 107 which formats the speech data or FACCH messages into transmit time slots. The output of the multiplexer 107 is fed to a 2-burst interleaver 108 which interleaves the encoded speech or FACCH data over two time slots (e.g., slots 1 and 4 in FIG. 2) so as to ameliorate the deteriorative effects of Rayleigh fading and thus providing further protection against channel errors, in addition to that provided by the error coding. This means that each speech time slot contains data from two consecutive speech coder frames or, similarly, that each FACCH message is spread over two time slots.

The output of the 2-burst interleaver 108 is provided as input to a modulo-2 adder 109 where the data is ciphered on a bit-by-bit basis by logical modulo-2 addition with a pseudo-random keystream provided by a ciphering unit 115. The inputs to the ciphering unit 115 may include the value of a frame counter 114 which is incremented once every 20 ms (i.e., once every TDM frame for a full-rate channel), and a secret key 116 which is unique to the wireless terminal. The frame counter 114 is used to update the ciphering code (pseudo-random keystream) once every 20 ms (i.e., once for every transmitted TDM frame). The ciphering code is generated using an encryption algorithm which manipulates the bits of the secret key 116. (It will be noted that although the above-described encryption technique was initially proposed for IS-136, IS-136 currently implements a different encryption scheme. However, it will be appreciated that the present invention is applicable to systems utilizing the current IS-136 encryption scheme, as well as to systems utilizing other encryption schemes.)

The ciphered data from the modulo-2 adder 109 and the interleaved SACCH data from the 22-burst interleaver 110 are provided as inputs to a burst generator 111 which is also provided with a synchronization (sync) word and a Digital Verification Color Code (DVCC) from a sync word/DVCC generator 112. The burst generator 111 formats bursts of data each including a sync word, DVCC, SACCH data and speech or FACCH data as shown in FIG. 5 (the "G" and "R" fields are for guard time and ramp time, respectively). The sync word is used for time slot identification and synchronization, and equalizer training at the remote receiver (i.e., base station). The DVCC is used to distinguish current traffic channels from traffic co-channels and ensures that the proper RF channel is being decoded by the receiver. The DVCC may be error-coded with, for example, a Hamming code. As will be seen below, the DVCC and sync word are also included in each of the bursts transmitted from the base station to the wireless terminal.

With further reference to FIG. 4, each of the message bursts from the burst generator 111 is transmitted in one of the three time slots (corresponding to respective physical channels) of the TDMA frame (full-rate) shown in FIG. 2 and discussed above. The burst generator 111 is connected to an equalizer 113 which provides the timing needed to synchronize the transmission of one time slot with the transmission of the other two time slots. The equalizer 113 detects timing signals sent from the base station (master) to the wireless terminal (slave) and synchronizes the burst generator 111 accordingly. The equalizer 113 may also be used for checking the values of the sync word and the DVCC received from the base station. Both the burst generator 111 and the equalizer 113 are connected to the frame counter 114 for timing purposes.

The message bursts produced by the burst generator 111 are provided as input to an RF modulator 117 which is used for modulating a carrier frequency in accordance with a modulation technique known as $\pi/4$ shifted, Differentially encoded Quadrature Phase Shift Keying ($\pi/4$ DQPSK). The use of this technique implies that the information to be transmitted by the wireless terminal is differentially encoded so that 2-bit symbols are transmitted as four possible changes in phase ($\pm\pi/4$ and $\pm 3\pi/4$) rather than absolute phases. To minimize errors due to noise in the selected RF channel, Gray coding may be used to map adjacent phase changes to symbols which differ in only one bit (since the most probable errors result in the receiver selecting an adjacent phase, such errors will be limited to single-bit errors). The carrier frequency for the selected RF channel is supplied to the RF modulator 117 by a transmitting frequency synthesizer 118. The burst-modulated carrier signal output of the RF modulator 117 is amplified by a power amplifier 119 and then transmitted to the base station through an antenna 120.

Reception at the wireless terminal 400 may be viewed as the reverse of transmission. The wireless terminal 400 receives burst modulated signals from the base station through an antenna 121 connected to a receiver 122. A receiver carrier frequency for the selected RF channel is generated by a receiving frequency synthesizer 123 and supplied to an RF demodulator 124 which demodulates the received carrier signal into an Intermediate Frequency (IF) signal. The IF signal is demodulated further by an IF demodulator 125 which recovers the original digital information prior to $\pi/4$-DQPSK modulation. The digital information is then passed to the equalizer 113 which formats the information into two-bit symbols, and then to a symbol detector 126 which converts the symbols into a single-bit data stream including speech or FACCH data and SACCH data. The symbol detector 126 distributes the FACCH or speech data to a modulo-2 adder 127, and the SACCH data to a 22-burst deinterleaver 135.

The modulo-2 adder 127 is connected to the ciphering unit 115 and is used to decipher the encrypted speech or FACCH data by subtracting, on a bit-by-bit basis, the same pseudo-random keystream used by the transmitter in the base station to encrypt the data. The deciphered output of the modulo-2 adder 127 is fed to a 2-burst deinterleaver 128 which reconstructs the speech or FACCH data by assembling bits from two consecutive frames of digital data. The 2-burst deinterleaver 128 is coupled to two channel decoders 129 and 130 which decode the convolutionally-coded speech or FACCH data, respectively, and check the CRC bits to determine if any error has occurred (the CRC bits also provide a method for distinguishing speech data from FACCH data). The speech data is fed from the channel decoder 129 to a speech decoder 131 which recovers the original digital speech signal. The signal is then converted to analog and filtered prior to broadcast by a speaker 133. Any FACCH messages are detected by a FACCH detector 132 and forwarded to a microprocessor 134 for appropriate action.

With continuing reference to FIG. 4, the 22-burst deinterleaver 135 reassembles the SACCH data which is spread over 22 consecutive frames. The output of the 22-burst deinterleaver 135 is provided as input to a channel decoder 136. Any SACCH messages are detected by a SACCH detector 137 and transferred to the microprocessor 134 for appropriate action.

The microprocessor 134 controls the activities of the wireless terminal 400 and communications between the wireless terminal 400 and base stations. Decisions are made by the microprocessor 134 in accordance with messages received from a base station and measurements performed by the wireless terminal 400. The microprocessor 134 is provided with a memory (not shown) and is also connected to a terminal keyboard input and display output unit 138. The keyboard and display unit 138 allows the user to initiate and respond to calls, and to enter information into the wireless terminal memory.

Figure 6B:
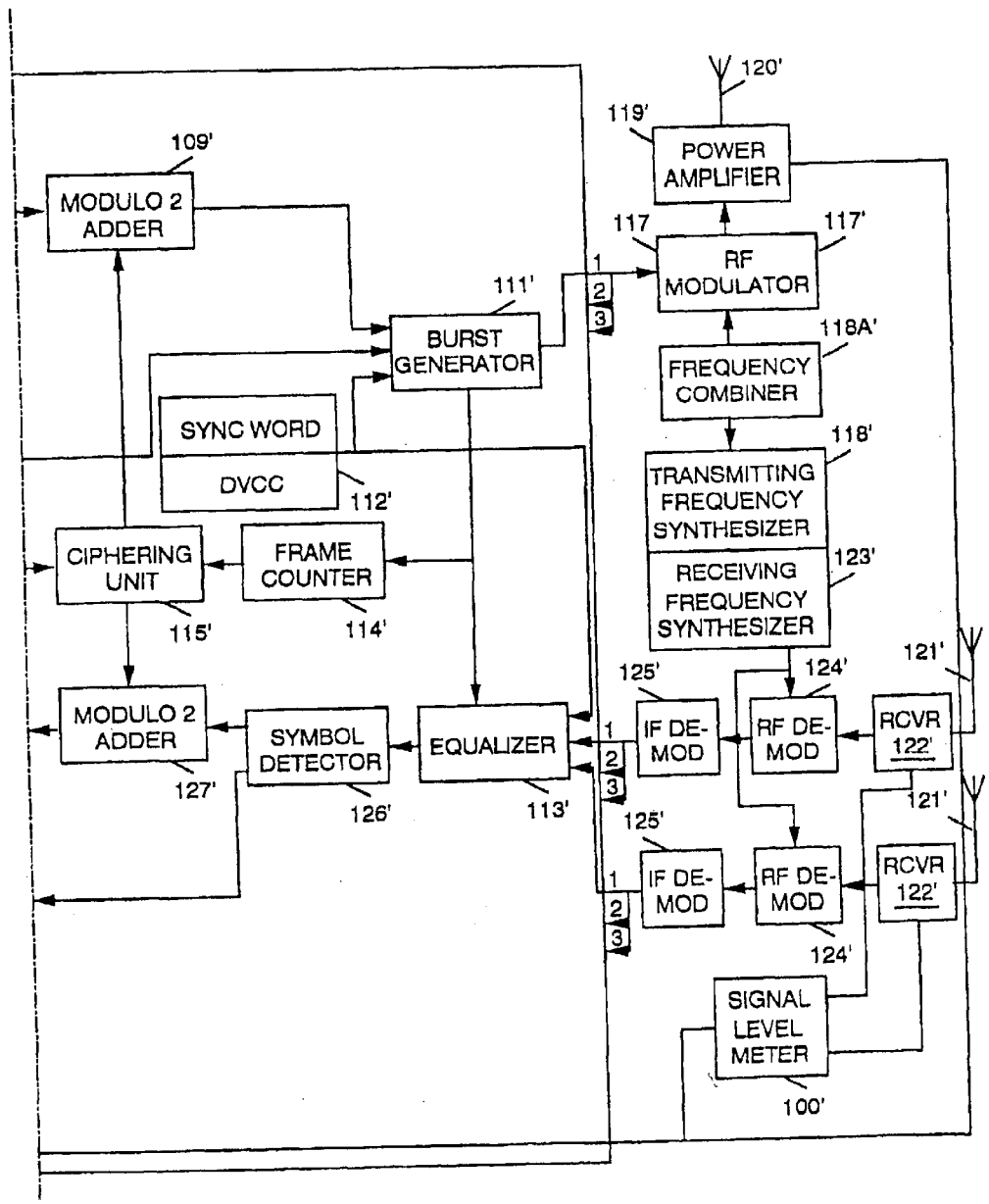
FIG. 6 is a block diagram illustrating a base station which may be used in accordance with embodiments of the present invention.

It should be noted that many of the components of the wireless terminal shown in FIG. 4 may be used to construct a base station 600 as shown in FIG. 6, in which like components are designated with the same reference numerals as in FIG. 4 and are further designated by a (') to distinguish the base station components from the wireless terminal components. The base station 600 of FIG. 6 communicates with the wireless terminal 400 of FIG. 4 using a slot format as shown in FIG. 7, which is similar to the slot format used by the wireless terminal, as shown in FIG. 5. As will be appreciated by persons of ordinary skill in the art, there may be certain differences in the construction of the base station and the wireless terminal. For example, as shown in FIG. 6, the base station may have not just one but two receiving antennas 121' and associated radio hardware 122'–125' for diversity reception. Furthermore, since the base station supports three (full-rate) digital traffic channels (DTCHs) per RF channel as shown in FIG. 2, the baseband processing hardware may be triplicated in the base station, and the IF demodulator 125' may have not just one but three outputs, one for each of the three digital traffic channels. In addition, since the base station usually operates on multiple RF channels, it may include multiple sets of radio channel hardware (baseband processing and radio hardware) as well as a programmable frequency combiner 118A' to carry out the selection of the RF channels to be used by the base station according to the applicable cellular frequency reuse plan. On the other hand, the base station may not include a user keyboard and display unit 138, but may include a signal level meter 100' to measure the strength of the signal received by each the two antennas 121' and to provide an output to the microprocessor 134' (for handoff purposes). Other differences between the wireless terminal 400 and the base station 600 will be readily apparent to those skilled in the art.

The wireless terminal 400 of FIG. 4 and the base station 600 of FIG. 6 are capable of operating on a digital traffic channel (DTCH), but may also be readily configured to operate on a digital control channel (DCCH) if, for example, the length and format of a DCCH slot are made compatible with those specified for the DTCH slot in IS-136 as suggested in the above-cited U.S. Pat. No. 5,404,355.

FIG. 4 shows additional components which, for example, can be used for decoding messages transmitted over a Paging CHannel (PCH) of the DCCH according to aspects of the present invention. Although PCH messages, like FACCH and SACCH messages, are interleaved to protect against errors induced by the radio channel, the interleaving of PCH messages is limited to within one slot (intra-slot interleaving) since, for purposes of sleep mode efficiency, the wireless terminal should not be awake for more than one PCH slot. As shown in FIG. 4, after demodulation and equalization, the page messages are deinterleaved in a 1-burst deinterleaver 139 before channel decoding in a channel decoder 140 and detection in a PCH detector 141. Any page messages are forwarded from the PCH detector 141 to the microprocessor 134 for analysis and action, as will be described in detail below.

For purposes of the description herein, although a DCCH format which is compatible with the IS-136 DCCH format may be used, in general any DCCH format or, for that matter, interleaving method may be used such as, for example, the DCCH format and interleaving method specified in the GSM standard. Furthermore, the DCCH may be implemented using transmission techniques other than or in combination with Time Division Multiplexing (TDM) such as, for example, Code Division Multiplexing (CDM).

Figure 8:
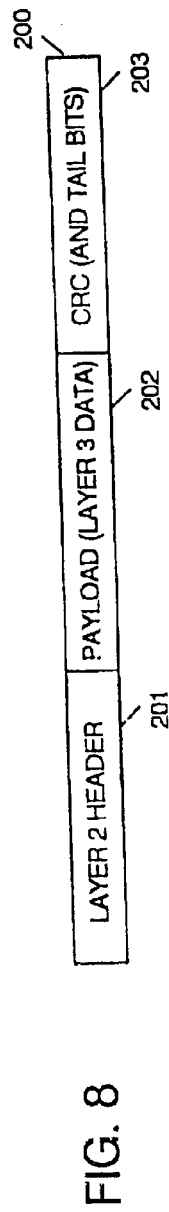
FIG. 8 illustrates an exemplary format for a Layer 2 (L2) frame which may be used to transmit a page message in compliance with conventional communications standards.
Figure 9:
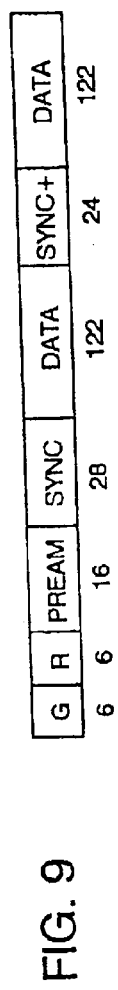
FIG. 9 illustrates an exemplary uplink slot format for a DCCH that is compliant with the IS-136 standard.

Paging channel operation according to industry or government standards (e.g., IS-95 and IS-136 in the U.S., GSM in Europe, and PDC in Japan) is illustrated in FIG. 8. Referring to FIG. 8, most of these standards provide for the construction of a page message (before error correction coding and interleaving) as a "L2" (L2) frame of data 200 containing a L2 header 201, a payload of "Layer 3" (L3) message data 202, and an error detection code such as a Cyclic Redundancy Check (CRC) code with tail bits 203 (tail bits are generally used with convolutional coding and are usually set to zero). The header 201 includes overhead information for radio resource management (e.g., actions to be taken by the receiver) or for other purposes, and may also include an indication of the type or length of the L3 data in the payload 202 (e.g., a bit may be assigned in the header 201 to indicate an empty page message in the payload 202). For an empty page, the payload 202 includes a predetermined value which is defined by the applicable standard (e.g., all zeros in IS-136). For a non-empty page, the payload 202 includes a Mobile Station IDentifier (MSID) and, possibly, auxiliary data such as an indication of the type of call (i.e., speech, data, etc.). The header 201 and the payload 202 are encoded with the CRC code 203 for error detection purposes.

Prior to transmission over the PCH, the frame 200 is encoded with an error correction code, and the encoded data is interleaved over one or more slots in accordance with the specification of the applicable standard. At the receiver (e.g., wireless terminal), the received slot(s) are first demodulated and, possibly, equalized. This is followed by deinterleaving of the demodulated (and possibly equalized) data and channel decoding of the deinterleaved data. The wireless terminal also checks for residual errors by calculating the CRC using the deinterleaved and decoded data (i.e., the received header 201 and payload 202) and comparing the calculated CRC with the received CRC (i.e., the received CRC 203). If the CRC comparison indicates that the data was correctly received, the wireless terminal checks the received header 201 to determine whether any action is required, and whether the message is an empty page. If no action is required and the message is an empty page, the wireless terminal can go back to sleep. If a certain action is required, the wireless terminal takes the required action. In addition, if the page is not an empty page (i.e., it is a non-empty page), the wireless terminal compares the received MSID with its own MSID which is stored in memory. If the MSIDs match, the wireless terminal sends a page response to the system. However, if the MSIDs do not match (i.e., the page is for another wireless terminal), the wireless terminal can return to sleep.

Figure 10:
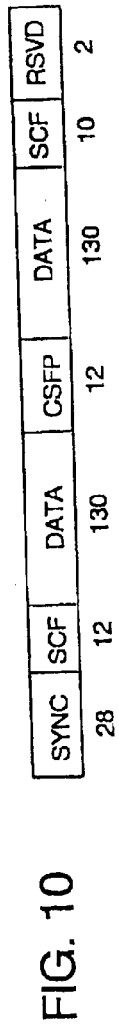
FIG. 10 illustrates an exemplary downlink slot format for a DCCH that is compliant with the IS-136 standard.

As shown in FIG. 10, the DCCH downlink slot includes a Shared Channel Feedback (SCF) field which contains information to support the random access scheme on the uplink. The DCCH downlink slot further includes a Coded Super Frame Phase (CSFP) field which contains information to aid the wireless terminal in finding the start of the superframe on the DCCH. Another notable difference between the DCCH and DTCH slot formats is the absence of interslot interleaving on the DCCH so as to facilitate sleep mode operation.

Figure 11A:
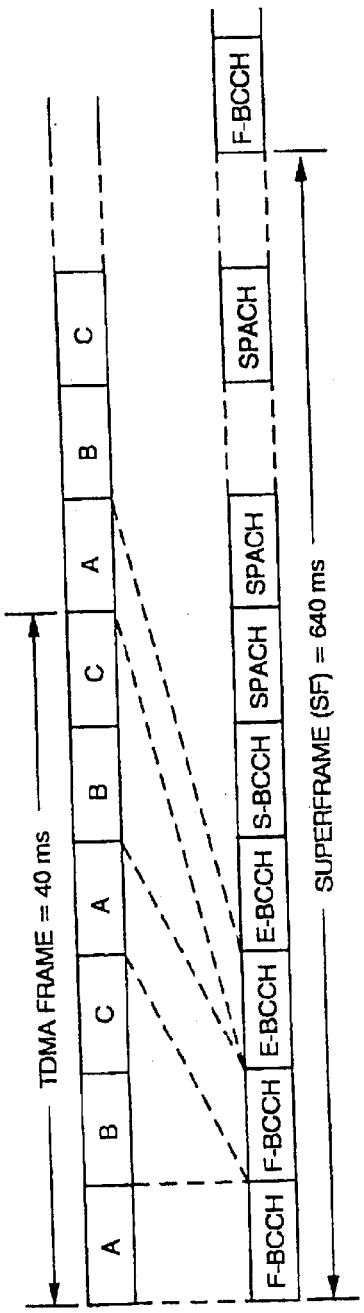
FIG. 11A illustrates an exemplary superframe structure defined on a DCCH compliant with the IS-136 standard.

FIG. 11A illustrates the frame structure of the (downlink) DCCH according to IS-136, the DCCH slots are mapped into logical channels which are organized into a series of superframes (note that IS-136 currently specifies no special frame structure for the uplink DCCH, as all time slots on the uplink may be used for system access by the wireless terminal). A full-rate DCCH A would occupy two of the six slots of an IS-136 TDMA frame, as shown in FIG. 11A. The logical channels specified in IS-136 include a Broadcast Control CHannel (BCCH) for carrying system-related information which is broadcast to all wireless terminals, and a Short message service, Paging and Access response CHannel (SPACH) for carrying information which is sent to specific wireless terminals. The structure and operation of the BCCH and SPACH are described in more detail below.

For efficient sleep mode operation with fast acquisition at cell (i.e., DCCH) selection, the BCCH is divided into logical subchannels as taught in the aforementioned U.S. Pat. No. 5,404,355. As shown in FIG. 11A, the BCCH includes a Fast BCCH (F-BCCH), an Extended BCCH (E-BCCH) and a point-to-multipoint Short message service BCCH (S-BCCH). The F-BCCH is used to broadcast DCCH structure parameters and other parameters required for accessing the system. The E-BCCH is used to broadcast information that is not as time-critical (for the operation of the wireless terminals) as the information in the F-BCCH. The S-BCCH is used for the broadcast short message service (SMS).

The SPACH is also divided into logical subchannels, including a point-to-point Short Message Service CHannel (SMSCH), a Paging CHannel (PCH) and an Access Response CHannel (ARCH) (not shown in FIG. 11A). The SMSCH is used for carrying user messages to a specific wireless terminal. The PCH is used for carrying page messages to different wireless terminals. The ARCH is used for responding to access requests from one of the wireless terminals, e.g., by delivering a channel assignment message to this wireless terminal.

The F-BCCH and E-BCCH allow the system to transmit different kinds of overhead information at different rates depending on its importance to the proper operation of the wireless terminals. Information defining the system configuration and the rules for system access by the wireless terminals is transmitted in the F-BCCH. Since this information is preferably transmitted at a rate which allows the wireless terminals to quickly access the system, a complete set of this information is typically sent in the F-BCCH once every superframe. Less critical overhead information, however, may be transmitted at a lower rate in the E-BCCH. A complete set of E-BCCH information may span several superframes. The S-BCCH, on the other hand, allows the system to decouple the transmission of overhead information from the broadcast SMS by providing a dedicated channel for SMS messages.

To decouple the requirement of periodicity of reading of the overhead information by the wireless terminal (e.g., for purposes of efficient sleep mode operation) from the requirement of periodicity of BCCH transmission by the system (e.g., for purposes of fast acquisition at cell selection), each of the F-BCCH and E-BCCH subchannels is associated with a change flag in another logical subchannel. A change flag indicates when the corresponding BCCH information has changed. For example, changes in the F-BCCH are indicated by a change flag in the PCH and changes in the E-BCCH are indicated by a change flag in the F-BCCH.

The change flags enable a wireless terminal to avoid rereading BCCH information which has not changed, thus allowing the wireless station to reduce battery drain, as taught in the above-cited U.S. Pat. No. 5,404,355. The wireless terminal will first read the required BCCH information when acquiring the DCCH. Thereafter, however, the wireless terminal will read only changed BCCH information and can stay in sleep mode when there is no change in the BCCH information. This allows for efficient sleep mode operation (i.e., low periodicity of reading BCCH information) and, at the same time, fast acquisition at cell selection (i.e., higher periodicity of BCCH transmission).

With continuing reference to FIG. 11A, a superframe SF is defined in IS-136 as a collection of 32 consecutive time slots (640 ms) for a full-rate DCCH (or 16 slots for a half-rate DCCH), starting with the first BCCH slot. The first slot(s) in the superframe are assigned to the F-BCCH, and the remaining slots are assigned to the E-BCCH, S-BCCH and SPACH. A wireless terminal determines from information in the F-BCCH slot(s) at the beginning of the superframe which of the other slots of the superframe are assigned to E-BCCH, S-BCCH and SPACH, respectively. As shown in FIG. 11A, each of the BCCH subchannels (F-BCCH, E-BCCH and S-BCCH) is assigned an integer number of the DCCH time slots in each repeating superframe. The other slots in the superframe are assigned to the SPACH subchannels (SMSCH, PCH and ARCH) on a fully dynamic basis. For this reason, the slots available in each superframe for SMSCH, PCH and ARCH are generically shown as SPACH in FIG. 11A. A wireless terminal identifies the usage of a SPACH slot (i.e., SMSCH, PCH or ARCH) from L2 header information.

IS-136 specifies three forms of Mobile Station IDentity (MSID) which may be used for paging a wireless terminal: the Mobile Identification Number (MIN), the International Mobile Station Identity (IMSI), and the Temporary Mobile Station Identity (TMSI). The MIN traces its roots to the EIA/TIA 553 and IS-54 standards (discussed earlier) and is a digital representation of the directory number of the wireless terminal according to the telephone numbering plan in North America. The IMSI is used for international roaming and it includes a country code which identifies the country of origin of the wireless terminal, and other information for identifying its home system (for billing and other purposes). The TMSI is assigned to a wireless terminal on a temporary basis within a specific area (e.g., the service area of an MSC or a location area in this service area) and the wireless terminal is usually reassigned to another TMSI after a predetermined period of time or when the wireless terminal moves out of this area. The primary benefit of using the TMSI is increased paging capacity, as the TMSI usually contains less bits than the MIN or IMSI and, hence, more pages can be carried in one PCH slot. Depending on the assignment procedures for the TMSI, another benefit may be increased user identity confidentiality.

A wireless terminal according to IS-136 may be assigned a MIN, an IMSI, or both a MIN and an IMSI. The MIN and/or IMSI are referred to as the Permanent Mobile Station IDentity (PMSID) in IS-136. A wireless terminal having both a MIN and an IMSI will only use one or the other as its PMSID, determined by BCCH data, as specified in the IS-136 standard. However, the wireless terminal may use both a PMSID (i.e., either MIN or IMSI) and a TMSI, but at different times. At any given time, the wireless terminal uses one or the other of PMSID and TMSI. The wireless terminal will usually monitor its PCH slot for its PMSID. If a TMSI is assigned to the wireless terminal, the wireless terminal will then monitor the PCH slot only for the TMSI. The TMSI assignment, however, may expire and if no new TMSI is assigned, the wireless terminal reverts back to using the PMSID when communicating with the system. In IS-136, an identity type (IDT) field may be included in the L2 frame to inform the wireless terminal which identity is being used in the page message. The IDT field, however, may not be included in the L2 frame if the type of identity is implicit from the type of frame. Other standards may require a wireless terminal to monitor PCH for both PMSID and TMSI.

Figures 11B, 11C, 16:
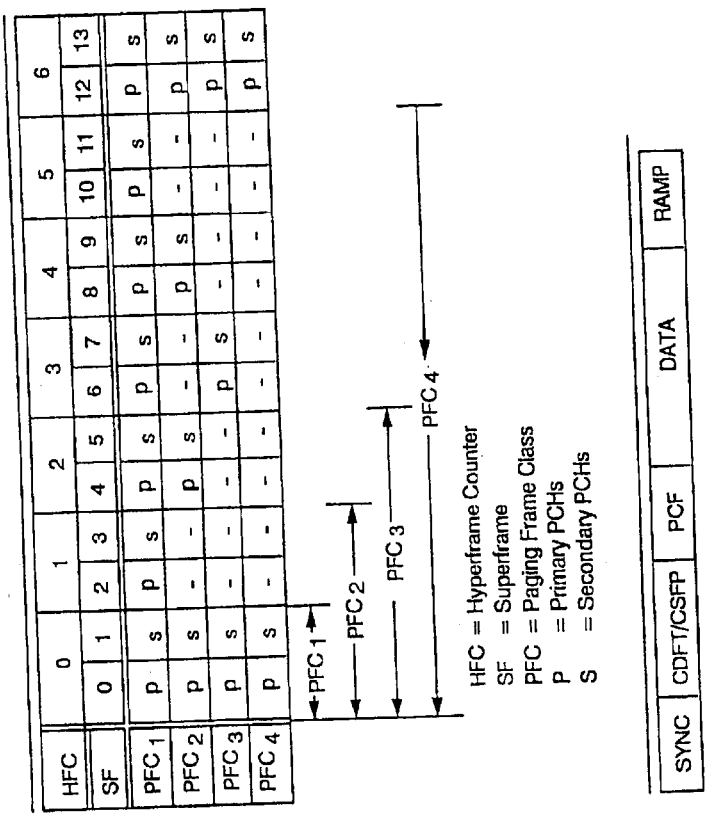
FIG. 11B illustrates an exemplary hyperframe structure defined on a DCCH compliant with the IS-136 standard.
FIG. 11C illustrates timing for paging frame classes defined for a DCCH compliant with the IS-136-standard.
FIG. 16 illustrates an exemplary downlink Packet Data Control Channel (PCCH) slot format in accordance with the IS-136 standard.

According to IS-136, all pages (whether containing PMSID or TMSI) are repeated in the corresponding time slot in the next superframe so as to increase the likelihood that a mobile station will receive a page even under severe radio conditions. If and only if the mobile station cannot decode the PCH slot in the first ("primary") superframe, it will read the corresponding PCH slot in the second ("secondary") superframe (the primary and secondary superframes are collectively referred as a "hyperframe"). FIG. 11B shows the format of the Hyperframe, including the F-BCCH F, E-BCCH E, S-BCCH S and Reserved channel R.

Under normal operating conditions, the mobile station will have to read only one slot per hyperframe, which enhances sleep mode efficiency. Each mobile station is assigned to one of eight different paging frame classes (PFCs) which define the frequency with which the mobile station reads its PCH slot (i.e, every nth hyperframe, where n is 1, 2, 3, 6, 12, 24, 48 or 96, providing for "sleep time" from 1.28 to 123 seconds). Analogous to the Super Frame Phase (SFP), a Hyperframe Counter (HFC) is provided in order for the mobile station to synchronize to the assigned Hyperframe. Examples of primary PCH (P) and secondary PCH (S) assignment for various paging frame classes $PFC_1$, $PFC_2$, $PFC_3$, $PFC_4$, which are aligned to HFC=0 are shown in FIG. 11C. For PFC greater than 1, alignment with any HFC value is possible. A mobile station may be reassigned to a different PFC to optimize the trade-off between sleep mode efficiency and call set-up delay, with lower PFC implying shorter sleep time and call-set-up delay while a higher PFC implies longer sleep time and call set-up delay.

Once the mobile station has read the BCCH (e.g., at power up), it determines which PCH slot to monitor based on its permanent mobile station identity (PMSID), and then enters sleep mode until it receives this slot or the BCCH information changes. More than one PCH may be defined in a superframe with each PCH occupying one slot. If the system is overloaded (e.g., during busy hours) with pages for one PCH slot, the mobile station may also be required to read another PCH slot (e.g., another PCH slot in the same superframe) as specified in the standard.

It should be noted that although a conventional mobile station complying with IS-136 will typically "wake up" to read its PCH slot every nth hyperframe as determined by its PFC, the PCH slot in any particular nth hyperframe may be "stolen" for use by another SPACH subchannel, as slots are assigned to SPACH subchannels on a dynamic basis and in accordance with capacity requirements. Until deinterleaving and decoding of the L2 header information in the SPACH slot, the mobile station typically cannot determine whether the SPACH slot is a PCH, an ARCH or a SMSCH.

IS-136, like other standards, uses a layered approach to the transmission of messages over the DCCH. FIG. 12 shows how a "Layer 3" (L3) message (e.g., a page message) is translated into one or more "Layer 2" (L2) frames which are then mapped into a "Layer 1" (L1) physical layer slot. The L3 message is parsed into as many L2 frames as needed under the applicable protocol (different protocols are specified for BCCH and SPACH). Each L2 frame includes L3 data and overhead information for L2 protocol operation. Each L2 frame is mapped into a single L1 slot through the addition of error coding (CRC and tail bits) and overhead information (header) specific to physical layer operation. For all IS-136 DCCH subchannels, L2 operation has been defined to be aligned with L1 operation such that a complete L2 protocol frame is carried within a single underlying physical layer slot. Thus, all bits of any L2 frame are sent within one physical slot (i.e., only intra-slot interleaving is performed after channel coding and before transmission).

IS-136 specifies different L2 frame formats for different types of L3 messages. Two exemplary L2 frame formats for SPACH messages are shown in FIGS. 13–14. FIG. 13 shows a "null frame" which is sent when no other information needs to be transmitted in a given SPACH burst, e.g., when transmitting an empty page message on the PCH, while FIG. 14 shows a "hard triple page frame" which is used for transmitting a non-empty page message containing up to three 34-bit MINs (IS-136 also specifies a few other paging frames, but FIG. 14 is illustrative for purposes of the present invention). Both of the frames in FIGS. 13–14 begin with a (SPACH) Header A and end with a CRC. Besides the Header A, the null frame of FIG. 13 contains a 1-bit "go away" (GA) field and Filler data (e.g., all zeros). The GA field indicates whether the current DCCH is barred (e.g., because of failure, maintenance, etc.) so as to trigger reselection of the DCCH (i.e., the value "0" designates that the DCCH is not barred while the value "1" indicates that the DCCH is barred). The hard triple page frame of FIG. 14, on the other hand, contains MSIDs MSID1, MSID2, MSID3 (in this case, the MINs) for up to three different mobile stations.

Referring now to FIG. 15, the Header A 300 includes a 3-bit burst usage (BU) field 302, a 1-bit PCH continuation (PCON) field 304, a 1-bit BCCH change notification (BCN) field 306, a 1-bit paging frame modifier (PFM) field 308 and a 1-bit bit S-BCCH change notification (S-BCN) field 310. The BU field 302 identifies the type of L2 frame (e.g. the value "000" designates a null frame as shown in FIG. 13 while the value "101" designates a hard triple page frame as shown in FIG. 14). The PCON field 304 informs the mobile station whether it should also read another PCH slot in the current superframe (e.g., the value "1" designates continued PCH reading). The BCN field 306 and S-BCN field 310 toggles (between one and zero) whenever there is a change in F-BCCH or E-BCCH information. The PFM field 308 informs the mobile station whether it should modify its paging frame class (PFC) operation, ie., the value "0" indicates that the mobile station should use its assigned PFC while the value "1" indicates that it should use the PFC which is one higher or one lower than its assigned PFC, as indicated by information sent in the BCCH. IS-136 also specifies a few other headers which are used in other types of SPACH L2 frames, but FIG. 15 is illustrative for purposes of the present invention. Thus, according to the IS-136 L2 frame formatting illustrated in FIGS. 13–15, an empty page message (null frame) is not necessarily devoid of information, as its L2 overhead (i.e., Header A and go away field GA) may actually contain non-filler information about activities which should be performed by the mobile station.

A Paging Attribute Descriptor (PAD) Channel

The present invention arises from the realization that a Paging Attribute Descriptor (PAD) channel can be provided (e.g., for a system such as the IS-136 system described above) that can be relatively quickly decoded by a mobile station to allow a mobile station (or other type of wireless station) to avoid unnecessary processing of Paging Channel (PCH) information. In particular, the PAD channel can be used to reduce the need to fully decode "empty" PCH messages or PCH messages addressed to other stations. According to embodiments of the present invention, a PAD channel message is carried in reserved bits in the DCCH slot described in FIG. 15. In one embodiment, a PAD channel message is communicated in three reserved bits in the CSFP field. In another embodiment, a PAD channel message for a particular PCH message is carried in reserved bits at the end of the preceding DCCH slot. In other embodiments, the PAD channel includes a combination of aforementioned reserved bits. In yet other embodiments, the PAD channel incorporates a change flag that is used to indicate whether control information, such as the L2 overhead information described above, has changed, necessitating reading of a page message or other actions.

For the IS-136 system described above, there are 5 reserved bits in a physical layer DCCH slot. Older mobile stations are typically designed to no assumption about the values of these bits, i e., they are ignored. Three of these reserved bits are in CSFP field. Recovery of these bits can be aided by the 4 redundancy bits in the (12,8) code used to encode the CSFP field, as the value of the Super Frame Phase (SFP) is known to a mobile station when it enters sleep mode. A decoding process which takes benefit of the known SFP value is described in U.S. Pat. No. 5,751,731 to Raith, the disclosure of which is incorporated herein in its entirety. Knowing the SFP, the (12,8) code effectively becomes a (7,3) code which has 8 code words.

The remaining two reserved bits are at the end of the DCCH time slot, just prior to the immediate next time slot's SYNC filed. In order to minimize the time for which a receiver has to read data, the reserved bits of one time slots can be associated with the succeeding time slot to provide a PAD Channel for the succeeding time slot.

According to an aspect of the present invention, a PAD channel is provided while maintaining the ability to monitor L2 overhead information. In a conventional IS-136 mobile station, the mobile station typically needs to check the CRC in order to correctly detect (verify) the L2 overhead information. However, because the CRC is based on both the overhead and the payload (L3 data), correct detection of the L2 overhead information would generally require the mobile station to decode the entire L2 frame in order to check the CRC. If this is routinely done, it would vitiate potential power savings from early detection and disposition of an empty page. On the other hand, if the mobile station detects an empty page as described before and, therefore, does not read and verify the L2 overhead information in the null frame, it may fail to take necessary actions.

For some L2 overhead information specified in IS-136, the mobile station has multiple opportunities to read this information. For example, if the BCN bit has been toggled in the current superframe to indicate that the BCCH information has changed, but the mobile station does not read L2 header, it will miss the opportunity to update the BCCH information during the next superframe. However, since the system generally maintains the BCN at its new value for several superframes, it may be sufficient for the mobile station to periodically decode (e.g., every 5th superframe) the entire PCH slot (even if it is carrying an empty page) in order to read the L2 header. At all other times, the mobile station can process page messages in accordance with the present invention.

A potential drawback to this solution is where the system, for example, toggles the BCN bit in two consecutive superframes and the mobile station reads the second (or another subsequent) superframe. In this instance, the mobile station will not update the BCCH information since the change notification would have returned to its original value after two consecutive toggles. However, it is believed that such instances will be rare in practice for two reasons. First, to ensure that a mobile station is alerted as to changes in BCCH information, existing systems usually do not toggle the BCN in two consecutive superframes because of the possibility that a mobile station may miss reading the PCH slot in the first superframe due to channel errors. Second, proper management of the BCCH requires that the frequency of changes in the BCCH information be no greater than the lowest frequency of reading the PCH slot according to the highest PFC of the mobile stations operating in the system (so that even the mobile stations assigned to the highest PFC will be able to keep up with changes in the BCCH information). In sum, for purposes of detecting the BCN over a noisy channel, the solution of fully decoding the PCH slot at regular intervals should be quite effective in practice.

Certain other L2 header information (e.g., PCON) is valid for only the current L2 frame. For a mobile station to act properly, it preferably does not miss a single instantaneous value of such a field. However, some of this instantaneous information may be activated under circumstances which would generally lead the mobile station to automatically read this information by application of the detection techniques of the present invention. In these circumstances, there is no need to explicitly detect the information element. For example, according to IS-136, the PCON bit is activated whenever one or more pages which must be sent by the system cannot be accommodated in the current PCH slot because it contains either the maximum number of MSIDs (e.g., 5 MSIDs must be sent and the system is using the L2 frame shown in FIG. 14) or a "soft" page (i.e., a page to a single mobile station with the rest of the slot being used to carry a user message to that mobile station). In either instance, the L2 frame in the current PCH slot, by definition, will contain at least one MSID and possibly some user data. Hence, if the mobile station is informed that the assigned PCH is carrying a non-empty page, the mobile station will process the PCH and read the L2 overhead including PCON.

In sum, it is desirable that a PAD-capable mobile station perform the following 7 tasks while reducing the frequency at which PCH messages are fully decoded:

1. perform tasks associated with the monitor the radio link quality (MRLQ) counter;
2. determine whether the PCON flag is enabled;
3. determine whether the GA flag is enabled;
4. determine whether the BCN flag has toggled;
5. determine whether the S-BCN flag has toggled;
6. determine whether the PFM flag has toggled; and
7. determine whether the mobile station is paged.

The Monitor Radio Link Quality (MRLQ) counter is used to determine whether the radio link reception quality is good enough to correctly process received data and conduct subsequent calling activity. If the quality is deemed poor, the mobile station can enter a cell reselection procedure in which it may choose another DCCH, most likely one transmitted from another base station.

The MRLQ counter is typically initialized to a value of 10 upon camping on a DCCH. For each unsuccessful L2 CRC check while reading the mobile station's assigned PCH, the MRLQ counter is decremented. For each successful CRC check, the MRLQ counter is incremented, with the value of the MRLQ counter typically being constrained such that it never has a higher value then 10. If the value of the MRLQ counter reaches zero, a radio link failure typically is declared, causing to the mobile station to begin a search for a better quality DCCH.

According to an aspect of the present invention, the existing MRLQ procedure is modified. The L2 CRC check may be replaced with a quality estimate derived from data recovered from the PAD channel. For example, the quality estimate can be based on the success in decoding a received CSFP field in which the PAD channel is carried according to the (12,8) Hamming code associated with the CSFP field. This code can detect single bit errors and some double bit errors. If a Hamming (12,8) decode error is detected the MRLQ can be decreased.

However, the short (12,8) code generally does not possess the same sensitivity to the radio link quality as the L2 CRC check. If the (12,8) code is more sensitive to bit-errors the mobile station may use two counters, e.g., a MRLQ-1 counter and a MRLQ-2 counter. The MRLQ-1 counter can be operated as per IS-136. The MRLQ-2 counter can be triggered by the decoding result of the (12,8) code. The MRLQ-2 can be preset to a different value then MRLQ-1, such as 15. However, for an extremely bad DCCH, e.g., when a mobile station enters an area with very poor reception quality, it may take longer for the mobile station to declare a radio link failure. In order to maintain the properties of the existing MRLQ counter but still allow the mobile station most often not processing the PCH L2 frame, the MRLQ-2 can be set to a smaller value and, whenever the counter reaches zero, the mobile station can be required to read the PCH and setting the MRLQ-1 to a value between 0 and 10. If the MRLQ-1 counter reaches zero a radio link failure is declared. If the MRLQ-1 counter reaches a higher value then the initial value e.g. 8 or 10, the mobile station can be allowed to go back in only reading the PAD channel, now setting the MRLQ-2 to it's initial value again.

The Go Away (GA) flag is enabled to indicate to the mobile stations that no service is provided by the system. One example of such an instance is when the system is disabled for repair or modification. The enabling of the GA flag is a very rare event.

The PCON flag can be enabled by the system when it has more pages to deliver to a paging group then the associated paging slot can carry. The mobile station, which was not paged in this slot, will read one or more additional paging slot before the nominal paging slot re-occurs.

When the PFM flag is enabled, the mobile station shall increase or decrease (as specified by data in the BCCH) the paging frame class with respect to the default paging frame class. The PFM bit will most likely only be enabled a few times per day.

The PCON flag should be detected during the reception of the paging slot in which it is set. However, the BCN, S-BCN, GA and PFM flags typically will maintain their values for multiple Paging frames i.e. multiple PCH readings. Thus, the mobile station typically has multiple chances to read the BCN, S-BCN, GA and PFM flags.

In order not to miss the activation of the PCON flag, it can be included in the PAD channel. It is also possible to map multiple control fields, e.g., the PCON flag and other control fields, to a single flag or value in the PAD channel without any significant increase in page message (PCH) readings. Thus, if either of the multiplexed flags is enabled, the PAD will indicate that PCH reading is required. The combined indication can be further mapped to a general value or bit requesting all mobile station to read the PCH.

The BCN and S-BCN flags (or proxies thereof) can be included separately or similarly combined to a single flag or value in the PAD channel. Because the BCN and S-BCN flags typically maintain their values for extended periods of time, the proxy flags may be sent with less frequency than the Paging Frame, i.e. the PCH reading frequency. Therefore, these flags may be time multiplexed into a single flag in the PAD channel. For example, a single flag field in the PAD channel can be used to alternately represent the BCN and the S-BCN flags in successive instances of the PAD. More then two flags can be also be time multiplexed in this fashion. For example, the PFM flag can be combined with the BCN flag or a combined BCN/S-BCN flag. In another example, the GA flag could be combined with the PFM flag.

A few exemplary PAD channel encoding schemes will now be described with reference to Tables 1–8, in particular, encoding schemes using three-bit codes as might be employed in a PAD channel implemented in the reserved bits of the CSFP field of a PCH message. As described below, the particular encoding of the PAD channel can be a predetermined system convention, or can be transmitted to each mobile station upon registration, activation or similar events.

Referring to Table 1, in a first embodiment, the PAD channel is encoded to differentiate among groups of mobile stations. A value "000" is interpreted as meaning that a PCH message does not require reading by any mobile station, and a value "001" is interpreted as "all mobile stations shall read PCH." Respective ones of the values "001"–"110" are assigned to respective ones of six (6) groups, with a mobile station being assigned to one or more of the groups. This refined differentiation allows mobile stations to avoid reading the PCH with a reduction of PCH reading rate corresponding to the number of groups in the PAD channel.

TABLE 1

| Value | Function |
| --- | --- |
| 000 | No reading required |
| 001 | group 1 shall read |
| 010 | group 2 shall read |
| 011 | group 3 shall read |
| 100 | group 4 shall read |
| 101 | group 5 shall read |
| 110 | group 6 shall read |
| 111 | Reading required for all mobile stations (page and/or any change/status flags) |

Mobile stations may be assigned according various types of groupings. These grouping types include: (1) grouping by MIN/IMSI value; (2) grouping by predetermined attributes not based on MIN/IMSI value; and (3) grouping according to group assignments sent to the mobile stations. For the first type of grouping, the mobile station and system need not exchange any further data to establish a common understanding of what a system shall do to trigger a PCH reading for a particular mobile station. An extension or modification to the existing formula which the system and the mobile station uses to establish a particular PCH slot in the super-frame can be used. In cases wherein one or more stations in the same group are paged, the system sets the PAD channel value to the value corresponding to that group. If mobile stations from multiple groups are paged and in a particular PCH message, the PAD value can be set to the "all mobile station shall read PCH" value.

Exemplary attributes which could be used for the second type of grouping include, but are not limited to, assigned PFC, type of communication (e.g., Packet Data, Voice, or SMS), electronic serial number (ESN), and form of address used (e.g., MIN, IMSI, TMSI20, TMSI24). For example, a plurality of mobile stations having different PFC's, e.g., PFC1, PFC2, PC3, . . . PFC8, may be assigned to monitor a particular PCH slot based on their PFC. The PAD channel value for a particular PCH message transmitted in this slot can then be used to instruct a particular PFC to fully decode the PCH message. Thus, for example, a PFC1 mobile station reading a PCH slot in every Hyperframe may be instructed to decode a particular PCH message, while a PFC2 mobile station assigned to monitor the same PCH slot will be not be instructed to read the particular PCH message.

The second type of attribute can be used to differentiate mobile stations according to capability. For example, if a PAD channel message indicates an incoming Packet Data transaction, and a mobile station is not equipped with such a capability, the mobile station can interpret the PCH message as being addressed to another mobile station, and avoid further processing of the PCH message.

The third attribute described above assigns PAD channel values based on a function of the Electronic Serial Number (ESN). For example, the PAD channel can contain the 2 least significant bits of the ESN, which can be used to identify four different groups.

The fourth attribute described above differentiates mobile stations based on the type of addressing the mobile stations use. A mobile station conforming to IS-136 is allowed to ignore all other forms of address than the "agreed" form of address according to the combination of the BCCH data and the Registration response message. Thus, if the PAD channel indicates that the form of address used in a particular PCH message is MIN and a mobile station is enabled to read TMSI20, the mobile station can ignore the particular PCH message. Note that a particular PCH message can only contain one form of address.

Exemplary techniques for sending the group, or more specifically, the values of the PAD channel that shall make the mobile station read the PCH, according to the third type of grouping include: (1) sending a PAD value assigned to a particular mobile station in a Registration response sent to the mobile station; (2) sending a PAD value to a mobile station as part of an Over the Air-interface Activation Teleservice (OATS) in which the mobile station is enabled to communicate in a system; and (3) sending a PAD encoding rules in message transmit over a broadcast channel (e.g. BCCH). For the first two types of communication of PAD value assignments, a PAD value assignment for a particular mobile station is sent to the mobile station in a message sent specifically to that mobile station. For example, the value "111" ("reading required for all mobile stations") and one other value can be sent to the mobile station, and the mobile station need not be informed about the other values, for example, the value for "no mobile station is required to read".

Alternatively, the PAD information message sent to a mobile station may indicate which of any predefined encoding rules apply, for example, any of encoding rules described in Tables 1–8, assuming that the mobile station has pre-existing knowledge of these rules. This method, mobile station specific and time specific group allocation, allows the system to assign the mobile stations in any type of groping, for example, to ensure equal distribution of the currently logged-in mobile station to the groups available. Every time the mobile station performs a "time based" registration, the system may reassign the mobile station to another group (new PAD values). With a predefined grouping, e.g. based on MIN/IMSI, the distribution becomes a statistical process based on which particular mobile stations are currently logged-in which the system can not modify.

For the third example, data transmitted over a broadcast channel may indicate which predefined encoding rules apply as described above and information for the mobile stations to determine the PAD values of interest. If the mobile station encounters an unrecognizable encoding rule (rule number), the mobile station can ignore the PAD channel and process the 7 previously identified task as per prior art. Table 2 shows an implementation which combines several "attribute" type grouping criteria. In particular, Table 2 illustrates an attribute-type grouping based on (1) a predetermined attributes not based on MIN/IMSI value, (2) assigned PFC and (3) form of address used.

TABLE 2

| Value | Function |
|-------|----------|
| 000 | No reading required |
| 001 | MIN enabled mobile stations shall read |
| 010 | IMSI enabled mobile stations shall read |
| 011 | TMSI type I enabled mobile stations shall read |
| 100 | TMSI type II enabled mobile stations shall read |
| 101 | TMSI type I enabled mobile stations with PFC 1 shall read |
| 110 | TMSI type I enabled mobile stations with PFC 2 . . . 8 shall read |
| 111 | Reading required for all mobile stations (page and/or any change/status flags) |

Table 3 shows an example in which 4 groups are defined, and in which particular PAD channel values can be used to instruct terminals from selected combinations of these groups to decode a PCH message. The groups can be defined using any of the above-described criteria. This type of PAD channel value assignment can be advantageously used in a PCH message contains pages for mobile stations from more than one group, as it allows multiple groups to be instructed to read the PCH message without requiring all groups to read the message.

TABLE 3

| Value | Function |
|-------|----------|
| 000 | No reading required |
| 001 | group 1 shall read |
| 010 | group 2 shall read |
| 011 | group 3 shall read |
| 100 | group 4 shall read |
| 101 | group 1 & 2 shall read |
| 110 | group 3 & 4 shall read |
| 111 | Reading required for all mobile stations (page and/or any change/status flags) |

Table 4 shows a similar encoding, except here the PAD channel is capable of differentiating between all possible two-group combinations of a set of groups. This encoding allows for as many groups as there are bits (3) in the PAD channel, such that each group is assigned a bit in the PAD channel. The encoding may be viewed as a bit-map, where each group is indicated by a bit in the PAD channel.

TABLE 4

| Value | Function |
|---|---|
| 000 | No reading required |
| 001 | group 1 shall read |
| 010 | group 2 shall read |
| 011 | group 1 & 2 shall read |
| 100 | group 3 shall read |
| 101 | group 1 & 3 shall read |
| 110 | group 2 & 3 shall read |
| 111 | Reading required for all mobile stations (page and/or any change/status flags) |

The examples illustrated in Tables 1–4 do not specifically provide for flags (e.g. BCN) related to L2 overhead information, as described above with reference to FIG. 15. In these embodiments, a separate field for change flags could be provided (e.g., in the reserved two bits at the end of the preceding DCCH slot, as described above), or the system may transmit a "all mobile stations shall read" value on the PAD channel for a predetermined number of successive PCH slots in order to allow the mobile stations to detect toggling of change flags or specific PCH messages containing a momentary flag (e.g., PCON).

In Table 5, one bit of the PAD channel is assigned as an change flag. Multiple "real" flags may have been mapped into this single flag, e.g. the BCN and S-BCN. The other 2 bits are assigned to one group each, i.e. a bit-map. The example shown in Table 6 differs from example 5 in that two bits of the PAD channel are assigned as change flags (e.g. BCN/PFM and S-BCCH). In Table 7, one bit in the PAD channel is assigned to the PCON flag, and the remaining two bits are bit-mapped to two groups. The encoding in Table 8 is designed to be robust against erroneous decisions due to bit errors in the decoding of the PAD channel. Although the (12,8) code can correct a single bit-error in the 12 bit CSFP field it may still result in an unsatisfactory performance. The encoding of the PAD channel effectively includes an (3,1) code, i.e., one bit of information sent in three bits. Any remaining single bit-error from decoding the (12,8) code can be corrected by the (3,1) code, e.g., the decoded value "010" will be interpreted as "000".

TABLE 5

| Value | Function |
|---|---|
| 000 | change flag = 0, no reading required |
| 001 | change flag = 0, group 1 shall read |
| 010 | change flag = 0, group 2 shall read |
| 011 | change flag = 0, group 1 & 2 shall read (all mobile stations) |
| 100 | change flag = 1, no reading required |
| 101 | change flag = 1, group 1 shall read |
| 110 | change flag = 1, group 2 shall read |
| 111 | change flag = 1, group 1 & 2 shall read (all mobile stations) |

TABLE 6

| Value | Function |
|---|---|
| 000 | change flags = 0, 0, no reading required |
| 001 | change flags = 0, 0, all mobile stations shall read |
| 010 | change flags = 0, 1, no reading required |
| 011 | change flags = 0, 1, all mobile stations shall read |
| 100 | change flags = 1, 0, no reading required |
| 101 | change flags = 1, 0, all mobile stations shall read |
| 110 | change flags = 1, 1, no reading required |

TABLE 6-continued

| Value | Function |
|---|---|
| 111 | change flags = 1, 1, all mobile stations shall read |

TABLE 7

| Value | Function |
|---|---|
| 000 | PCON = 0, no reading required |
| 001 | PCON = 0, group 1 shall read |
| 010 | PCON = 0, group 2 shall read |
| 011 | PCON = 0, group 1 & 2 shall read (all mobile stations) |
| 100 | PCON = 1, no reading required |
| 101 | PCON = 1, group 1 shall read |
| 110 | PCON = 1, group 2 shall read |
| 111 | PCON = 1, group 1 & 2 shall read (all mobile stations) |

TABLE 8

| Value | Function |
|---|---|
| 000 | No reading required |
| 001 | not valid |
| 010 | not valid |
| 011 | not valid |
| 100 | not valid |
| 101 | not valid |
| 110 | not valid |
| 111 | Reading required for all mobile stations (page and/or change flags and/or Page continuation) |

As described earlier, in IS-136, there are two reserved bits in a DCCH slot (see FIG. 10). In one embodiment of the present invention, respective ones of these two reserved bits can be assigned the BCN and the S-BCN flags in lieu of including them in a PAD in the CSFP field. Time multiplexing of both flags into one of the reserved bits is also possible. As the reserved bits are at the end of the time slot, it may be advantageous to associate the reserved bits in a first slot with the PCH message in a second succeeding slot, in order for the mobile station to process as small amount of data as possible. Thus, after the mobile station acquires time synchronization with the aid of the SYNC of the second slot, it can read the two earlier received bits of the first slot to determine the status of the flags.

In summary, the above-described 7 tasks can be achieved according to the present invention without requiring the mobile station to read each PCH channel message. By including toggling flags in the PAD channel or in fields outside of the PAD channel but associated therewith, the above-described status indicators and channel quality can be monitored without fully decoding PCH messages. It should be noted that PAD channel can be viewed as including both the CSFP and Reserved bits at the end of the DCCH slot, even if these bits are temporally separated.

In order to minimize the required time for the mobile station to stay "awake," it is preferable that the PAD channel be placed close to the SYNC filed. However, in order to serve both old and new mobile stations (backwards compatibility), it is preferable to use existing reserved fields for the PAD channel. If the capacity penalty of having a system supporting two distinct DCCH formats is acceptable, or for a complete new system, an optimal encoding and placement for the PAD channel can be chosen. If the PAD filed is not located close to the SYNC field it may be possible, especially for good radio channel condition, to omit acquiring time synchronization and instead perform "blind synchronization" of the data around the PAD channel field.

Although the use of the reserved bits in the CSFP filed for the PAD channel allows for backwards compatibility, the location of the CSFP filed is far away from the synchronization word, which may require the mobile station to decode about half of the PCH slot before it can recover the PAD channel message. According another embodiment of the present invention, the PAD channel uses the two reserved bits in the slot just prior to a PCH slot for the PAD channel associated with the PCH slot. As described above, because of the proximity of these bits to the SYNC field of the PCH slot, use these two slots for the PAD channel allows the mobile station to reduce the amount of processing needed to acquire the PAD channel, in comparison to a PAD Channel carried in the CSFP field of the PCH slot. After acquiring time and channel synchronization, the base station can immediately read the two bits prior to the SYNC field, without requiring further decoding of the PCH slot.

The encoding for such a PAD channel could be, for example, "00" for "no PCH reading" and "11" for "all mobile stations required to read." Any further allocation of functions to the two bits may make the PAD channel very unreliable. However, even using two-bit codes for the two values may be insufficient. The mobile stations may be required to estimate the radio link quality (which they do for cell reselection purpose anyway) and switch between two modes dependent on the radio link quality. In a first mode, the mobile stations may be required to read the PAD channel, while in a second mode the mobile stations are required to process the PCH according to prior art, i.e., fully decode the PCH. Soft information and biased decision as described earlier is recommended.

If the PAD channel is implemented in the two bits immediately preceding the PCH slot, an alternative MRLQ process can be used. For example, a channel quality estimate of the sync word and/or the two reserved bits can be used with the MRLQ process, rather than a channel quality estimate based on the CSFP. Preferably, the MRLQ process does not require reading more data than what the mobile station is required to read for other reasons.

In yet another embodiment of the present invention, the PAD channel includes both the reserved bits at the end of the slot immediately preceding the PCH slot and the reserved bits in the CSFP field of the PCH slot. A two-stage decoding process may be used with such an embodiment. When channel conditions are good, the mobile station reads the two PAD channel bits immediately preceding the PCH slot. When channel conditions become degraded, the mobile station can switch to reading the PAD channel bits in the CSFP field. Thus, when channel conditions are good and the mobile station is operating in the first mode, the mobile station can avoid decoding most of the PCH slot. Switching between the first and second modes can be made dependent on any channel quality estimate, such as, an estimate of the quality of the received data during the syncword and/or the PAD channel itself.

For a two-staged PAD implementation, the scope of the first PAD data need not be the same as for the second PAD data. For example, due to less redundancy (i.e. less reliability), the first stage may only transmit two values: read and don't read. The second stage may contain further refinements in it's ability to inform the mobile stations what data is contained in the PCH e.g. as per table 1. The system may enable any stage of a multi staged PAD channel independently by the use of mobile station specific messages (addressed messages) or common broadcast messages as described above.

The TIA IS-136 specification is currently proposed to be amended to support Packet Data operation. A Packet Control Channel (PCCH) channel structure and sleep mode operation similar to the DCCH has been proposed, using a superframe structure similar to that shown in FIG. 11. A proposed downlink slot structure of the PCCH is showed in FIG. 11D. As with the DCCH, the DCCH slots include a super frame phase encoded with the same (12,8) code as used for the CSFP of the DCCH. There are, however, no reserved bits in this proposed slot format, as the bits corresponding to the three reserved bits in the CSFP of the DCCH are used for other purposes.

According to another aspect of the present invention, PAD channel is provided without requiring use of DATA (or other) fields of the PCCH. According to this technique, mobile stations can achieve power savings as when they are sleeping on the DCCH using the above disclosed PAD channel.

The Coded Data Frame Type (CDFT) field in the PCCH of FIG. 11D is used to implement a Data Frame Type (DFT) function that provides for variable coding of transmitted data. According the DFT function, the CDFT informs the mobile station about which modulation type and/or the channel coding type is used in the remaining of the timeslot (i.e., the DATA field), with the SYNC field and the data in the (12,8) code being modulated and encoded with a default modulation. The Packet Data Channel Feedback (PCF) field may use modulation and channel coding according to the data in the CDFT filed or may also have a predetermined modulation/coding. The function of indicating what modulation and channel coding type the DATA filed is subject to on a packet data channel is disclosed in U.S. Provisional Application No. 60/111,876 to Raith, herein incorporated by reference in its entirety.

Within the context of modes of operation of the PCCH envisioned under IS-136, it is believed that function of the CDFT field will not be exercised very frequently, i.e., the type of modulation and channel coding will be initially set to a default setting, and will unlikely change thereafter. For example, 8-PSK may be made the default choice for modulation of the DATA field. Only when severe time dispersion is detected, (e.g., typically only in hilly terrain), will an alternative modulation (e.g, DQPSK) be used. Thus, for a particular location, the modulation type may be fixed to 8-PSK for all time slots to all users.

According to an embodiment of the present invention, in order to introduce a PAD channel on the PCCH, without reducing the DATA field and to maintain similar procedures as for the DCCH, the CDFT field is used to carry the PAD channel while reserving the capability to revert to the original "modulation selection" function when a need arises. In order to provide this capability, the PBCCH (similar to BCCH on the DCCH) can include a descriptor that informs the mobile stations whether the 3 bits originally proposed for the DFT function should be interpreted by the mobile stations as the DFT function or a PAD channel.

Upon acquiring and camping on PCCH ("log-in"), a mobile station reads the PBCCH. If the BCCH data in the PBCCH indicates that the DFT function is enabled, the mobile station processes PCH slots in a "normal" fashion, i.e., it does not interpret the CDFT field as containing a PAD channel and always read its assigned PCH. If, however, the PBCCH data indicates the PAD channel is enabled, the mobile station reads the PAD channel (and responds accordingly), while ignoring the DFT function. When the DFT function is so disabled, the chosen type of modulation and channel coding of the DATA field can be indicated in the PBCCH.

A three-bit PAD channel that can be mapped on either the CFSP of the DCCH or the CDFT of the PCCH may be used, using procedures and formats for the PCCH that are similar to those described for a PAD channel using the CFSP of the DCCH. If it is desired to use a two-bit PAD channel that can be mapped on to the two reserved bits of a preceding DCCH slot or to similar bits on the PCCH, i.e., 2 other reserved bits on the physical layer, there are three choices for the design of the PCCH. The first choice is to let a logical PAD channel carried in the CDFT of the PCCH have reduced scope, ie., The contents of 3 reserved bits within the (12,8) code can be the same. The second choice is to redefine the scope of the PBCCH based PAD channel such that it includes functions that are assigned to the other two reserved bits for the DCCH. The third choice is to redefine the slot format of the PBCCH to include two bits for the PAD channel, preferable located near the sync word (before or after) as per the DCCH.

If the system wants to activate the DFT function from a disabled state, the data in the PBCCH will change and the associate change flag toggled. This change flag can, as explained for the DCCH case, be part of the scope of the PAD channel and also be placed in the L2 frame as per the DCCH. Thus, mobile stations already in sleep mode can know that subsequent data transactions should be performed with the DFT function enabled.

Another benefit that can be provided by this embodiment of the present invention is that the mobile station can avoid making mistaken interpretations of the actual modulation/ coding to be used. When the PBCCH indicates to the mobile station that the DFT function is disabled, the mobile station may completely omit reading the CDFT field, thus avoiding loss in data throughput caused by erroneous decoding of the DFT function.. The disabling of the DFT function may not necessarily imply that the PAD channel, or any other function, is enabled.

A technique for informing a mobile station whether an original reserved set of bits or single bit is still reserved to a default value, or has been assigned a new function is described in the aforementioned U.S. Pat. No. 5,751,731. This technique can be expanded, according to the present invention, to allow different generation mobile stations to perform different appropriate operations depending on the status of the reserved bits. For example, a first generation mobile station may be informed that it make use of reserved bits set to predetermined values in enhancing the performance of channel decoding, e.g., information corresponding to the CSPF may be decoded according to the associated (12,8) code can be used as a synchronizing information for and equalizer or demodulator. However, if the first generation mobile station is informed that the reserved bits are assigned a second generation function, e.g. for a PAD channel, the first generation mobile station can treat the reserved bits as unknown bits, and use alternative synchronization information.

A second generation station which supports the new function can, however, make use of the added functionality. For example, when a control channel (e.g., the BCCH) indicates that a CFSP or CDFT field is used for a function, the second generation station may interpret this to mean that the field in question includes a PAD channel, and may use the information in the subject field accordingly. A third-generation station may interpret the information received from the control channel as indicating that yet another function is enabled, and may thus process the information in the subject field in another manner. Thus, information about a set of bits provided to mobile stations in a control channel (e.g., on the BCCH) can indicate "reserved", function 1, function 2, . . . function n.

Error in decoding the PAD channel can introduce decision errors of two types. A first type of error occurs when the decoded PAD data indicates reading of the associated PCH message is required when, in fact, the originally transmitted PAD data instructed that no reading is required, resulting in, for example, decoding of an empty page. A second type of error occurs when the decoding PAD information indicates that no reading of the associated PCH is required when, in fact, reading of associated PCH message is required. Errors of the first type are generally harmless, as the mobile station continues to process a non-relevant PCH and eventually (after PCH decoding) arrives at a correct decision that this is a non-relevant PCH (e.g. a non PCH message e.g. an ARCH message). If such errors are rare (e.g., less than 1% error rate), the mobile station can still realize significant power savings from early detection capability provided by the PAD channel.

Errors of the second type, on the other hand, can be more significant. These error imply that the mobile station was paged (it is also possible that the non-empty page is intended for another mobile station), but did not read the page and thus may miss a call. However, since a typical mobile station only receives a few calls per day, the instances in which it will miss a call because of PAD reading failure may be rare. Nevertheless, errors of the second type, even if rare, are of more concern since they could degrade the level of service received by the user of the mobile station. When using the PAD channel reading technique of testing for a non-relevant PCH, it is generally desirable to reduce data processing as much as possible while minimizing all types of decision errors. However, because of the relative importance of the two error types, it may be desirable to control errors of the second type at the expense of errors of the first type.

The desired bias may be accomplished through computer simulations or calculations, or from experiments with mobile stations in the field, which reveal the preferred or ideal PAD channel decoding method in order to keep errors of the second type below a certain level. The (read PCH/not read PCH) decision threshold may be biased such that more of the errors made by mobile station are of the first type than of the second type. For example, with the PAD channel encoding as defined in Table 8, if any of the three bits in the PAD channel is interpreted as a "1," the mobile station could be made to read the associated PCH message. The decision as to whether or not to read a particular PCH message can be based on "soft decision" decoding instead of "hard decoding," that is, the quality (likelihood of correct received data) of the received PAD channel bits may be factored in when making the decision whether to read PCH. For example, the likelihood for the PAD data being all zeros ("000") and being all ones ("111") could be compared. The logarithmic likelihood of each bit can, for example, be negative signed for a bit most likely being sent as zero (0) and positive signed for a bit most likely sent as one(1). The logarithmic likelihoods can then be appropriately signed, and summed to yield a new decision variable (X). The combination of using biased and soft decision is also possible, i.e. the threshold of the bit-wised summed logarithmic likelihood's for reading the PCH may not be symmetric, i.e. need not be centered at zero (for encoding example defined in table 8 which only has two values)

In practice, the decision threshold may have to be continuously adjusted to optimize performance in view of the quality of the current radio channel as reflected in the received signal strength (RSS), signal-to-noise ratio (SNR), frame error rate (FER), bit error rate (BER) or some other channel quality measurement taken or estimate made by the mobile station. Higher RSS or SNR or lower FER or BER generally imply a higher quality channel, which may allow the mobile station to move the threshold from a more conservative position to a less conservative position. Conversely, lower RSS or SNR or higher FER or BER may imply a lower quality channel, which may require the mobile station to move the decision threshold from a less conservative position to a more conservative position. For example, if the mobile station is testing for a non-relevant PCH and the initial decision threshold is set to zero (i.e., decision variable X is compared to zero), the mobile station may use instead a threshold of −d (compare X with minus d) if channel quality improves and, conversely, a threshold of +d (compare X with +d) if channel quality deteriorates.

A wireless station may also be configured to operate in either a full decoding mode in which it fully decodes all PCH slots as with the prior art, or a refined decoding mode in which it decodes the PCH slots in accordance with the teachings of the present invention. These two modes can be invoked by the mobile station at different times and under different circumstances. For example, the mobile station can use the full decoding mode as a reference for adaptively adjusting the decision threshold in the refined decoding mode. This may be implemented by placing the mobile station in an initial training phase in which it invokes both decoding modes (starting perhaps with a relatively conservative decision threshold for the refined decoding mode). During this training phase the mobile station compares the decisions made by the refined decoding mode with the actual outcome as determined from the full decoding mode, and then adjusts the decision threshold in the refined decoding mode so as to minimize errors (e.g., errors of the second type as discussed previously). After this initialization phase, the mobile station will invoke only the refined decoding mode except at predetermined intervals (or in response to particular events) when it once again readjusts its decision threshold. It should be noted that decoding of the PAD channel being transmitted inside another code (e.g. the (12,8) code) can take many forms e.g. a two step decoding or performed a in a single step. If a two step decoding is performed, the decoding of the (12,8) code can be hard or soft, one or no bit errors may be corrected. Many variations are possible. In the case of IS-136, where the SFP value is known when entering sleep mode, the decoding can be performed as a (7,3) code having 8 code words. If the PAD encoding as described in Table 8 is used, where there are only two entries, the (7,3) code is effectively a (7,1) code having two code words. The likelihood of the first and second code word being transmitted can be compared in making the decision (soft information and/or biased decisions threshold are very applicable).

The PAD channel embodiments, as described above, may be expected to allow the mobile station to avoid fully processing the majority (up to, for example, 85–95%) of PCH slots received over a 1-day period.

Note that the third type of PAD channel grouping (using a mobile station specific message or BCCH message) includes the methods used to define the first and second type of grouping (predefined assignment) as a special case. However, the third grouping type allows different methods for different mobile stations and the system can change its group definition strategy over time. Furthermore, the system can enable and disable functions of the PAD channel over time, e.g. time-of-day. For example the system can change from a scenario of having the complete PAD channel being as described in Table 8 to having the PAD channel being Table 1 plus having the two reserved bits before the SYNC filed taking the function of being change flags for BCCH.

FIGS. 17–24 are flowchart illustrations illustrating exemplary operations for providing a PAD channel functionality as described above in a wireless communications system according to aspects of the present invention. It will be understood that blocks of the flowchart illustrations of FIGS. 17–24, and combinations of blocks in the flowchart illustrations, may be implemented using electronic circuits included in wireless stations such as the wireless terminal 400 and base station 600 illustrated in FIGS. 4 and 6, respectively. It will also be appreciated that blocks of the flowchart illustrations of FIGS. 17–24, and combinations of blocks in the flowchart illustrations, may be implemented using components other than those illustrated in FIGS. 4 and 6, and that, in general, the blocks of the flowchart illustrations of FIGS. 17–24, and combinations of blocks in the flowchart illustrations, may be implemented in special purpose hardware such as discrete analog and/or digital circuitry, such as combinations of integrated circuits or one or more application specific integrated circuits (ASICs), as well as by computer program instructions which may be loaded onto a computer or other programmable data processing apparatus to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations of FIGS. 17–24 support electronic circuits and other means for performing the specified functions, as well as combinations of steps for performing the specified functions. It will be understood that the circuits and other means supported by each block of the flowchart illustrations of FIGS. 17–24, and combinations of blocks therein, can be implemented by special purpose hardware, software or firmware operating on special or general purpose data processors, or combinations thereof.

Figure 17:
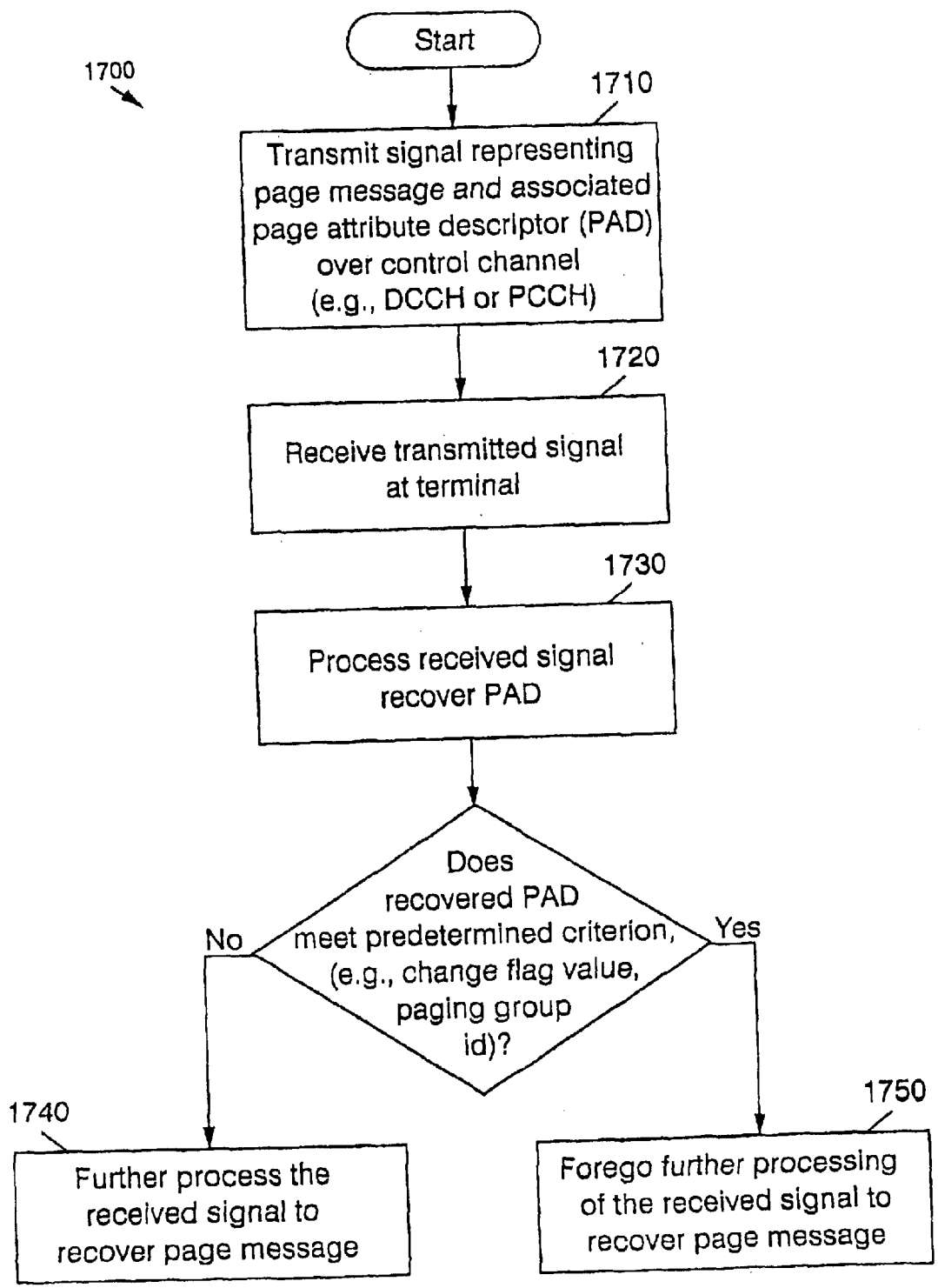

FIG. 17 illustrates exemplary operations 1700 according to one embodiment of the present invention, which provides a PAD functionality in a control channel that carries page messages. A signal representing a page message and an associated PAD is transmitted over at least one DCCH or PCCH slot (Block 1710). The transmitted signal is received at a wireless station, such as the wireless terminal 400 of FIG. 4 (Block 1720). The received signal is processed to a sufficient extent to recover the PAD (Block 1730). If the recovered PAD meets a predetermined criterion, e.g., if the PAD includes information that indicates that the receiving wireless station needs to recover the associated page message, such as a group value assigned to the wireless station or a change flag indicating a change in L2 overhead information, the wireless station further processes the received signal to recover the page message (Block 1740). If not, the wireless station foregoes further processing, thus allowing the wireless station, for example, to go back to sleep and conserve energy (Block 1750).

Figure 18:
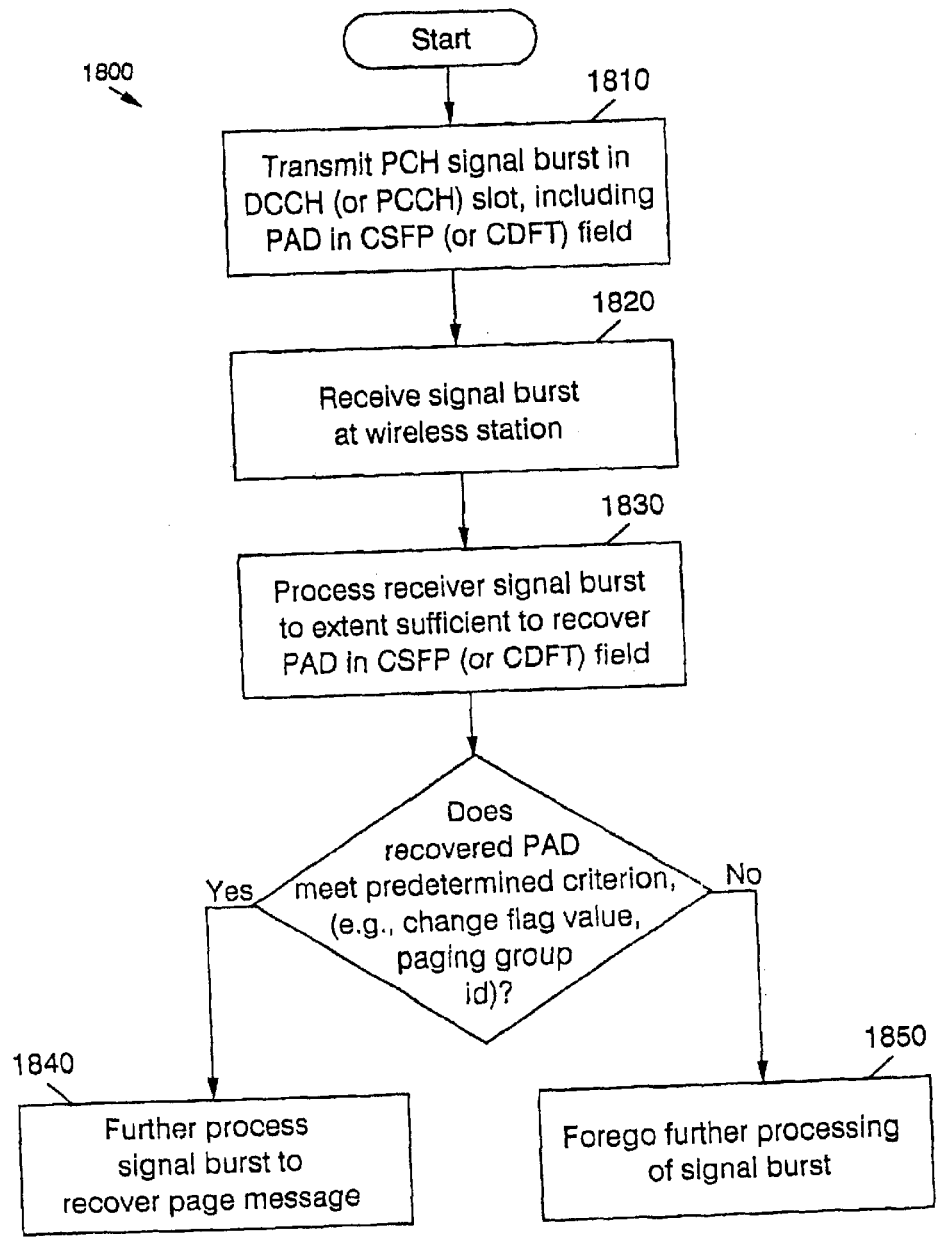

FIG. 18 illustrates exemplary operations 1800 for providing a PAD channel embedded within a page message that is transmitted on a control channel, in particular, within a PCH message transmitted in a DCCH or PCCH slot. A signal burst representing a page message including a PAD therein, e.g., in the CSFP field of the page message, is transmitted in a DCCH (or PCCH) slot (Block 1810) and received at a wireless station (Block 1820). The received signal burst is processed, e.g., demodulated and decoded, to an extent sufficient to recover the PAD, for example, by demodulating the received signal burst sufficiently to recover data corresponding to the CFSP field, and decoding the recovered data to recover the PAD (Block 1830). If the recovered PAD meets a predetermined criterion, for example, if the PAD includes information that indicates that the receiving wireless station needs to recover the associated page message, such as a group value assigned to the wireless station or a change flag indicating a change in L2 overhead information, the wireless station further processes the received signal to recover the page message (Block 1840). If not, the receiving wireless station foregoes further processing of the received signal burst (Block 1850).

Figure 19:
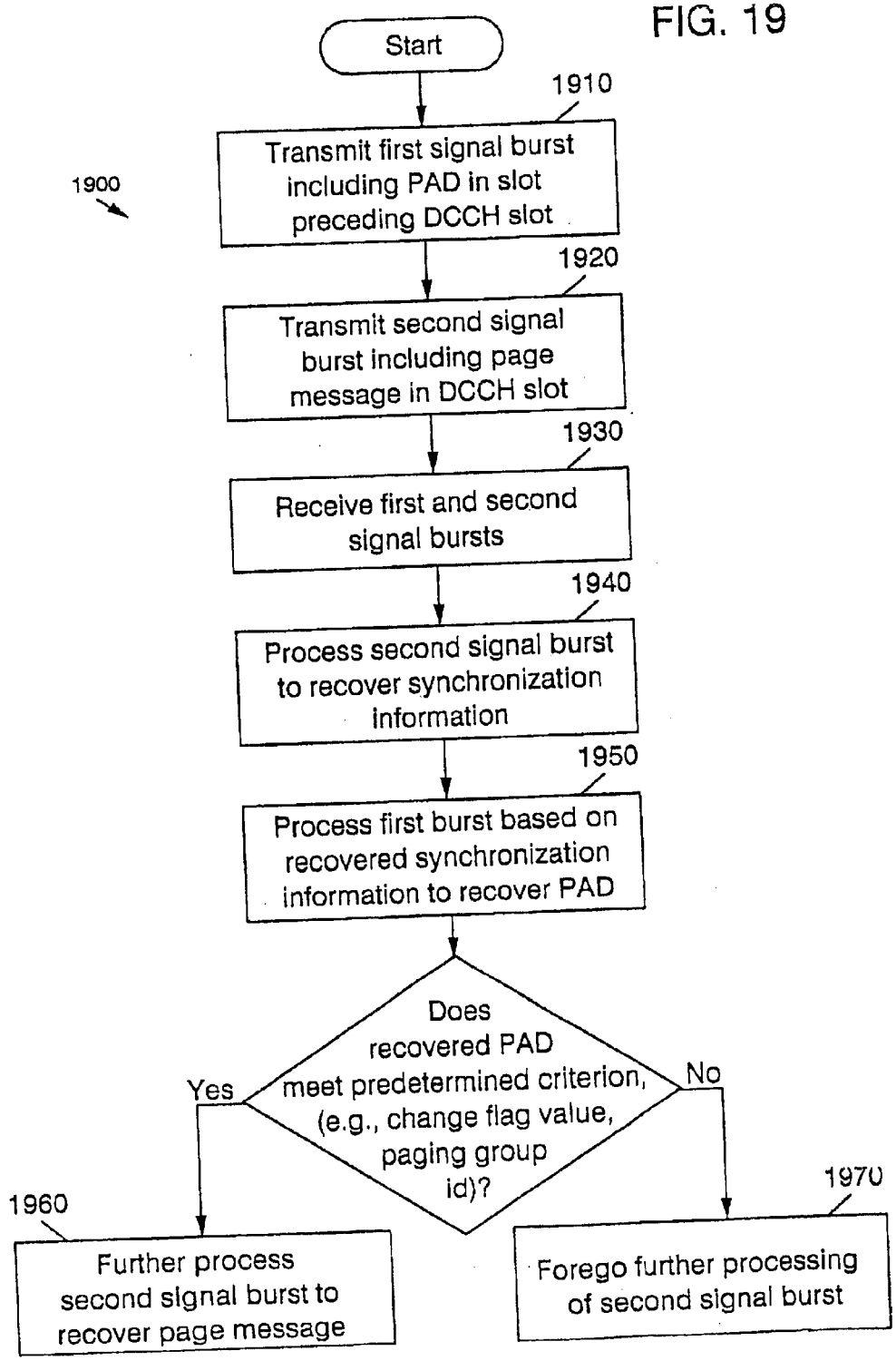

FIG. 19 illustrates exemplary operations according to yet another embodiment of the present invention, in which a PAD functionality is provided outside of the paging channel. A first signal burst including a PAD is transmitted in a first slot, e.g., in the reserved bits of a slot preceding a DCCH slot that carries a page message in a PCH (Block 1910). A second signal burst including a page message is transmitted in a second slot, e.g., in the DCCH slot that carries the PCH page message (Block 1920). The first and second signal bursts are received at a wireless station (Block 1930). The received second signal burst is processed sufficiently to recover synchronization information therein (Block 1940). The received first signal burst may then be partially processed using the recovered synchronization information to recover the PAD (Block 1950). If the recovered PAD meets a predetermined criterion, for example, if the PAD includes information that indicates that the receiving wireless station needs to recover the associated page message, such as a group value assigned to the wireless station or a change flag indicating a change in L2 overhead information, the wireless station further processes the received second signal burst to recover the page message (Block 1960). If not, the receiving wireless station foregoes further processing of the received second signal burst (Block 1970).

Figure 20:
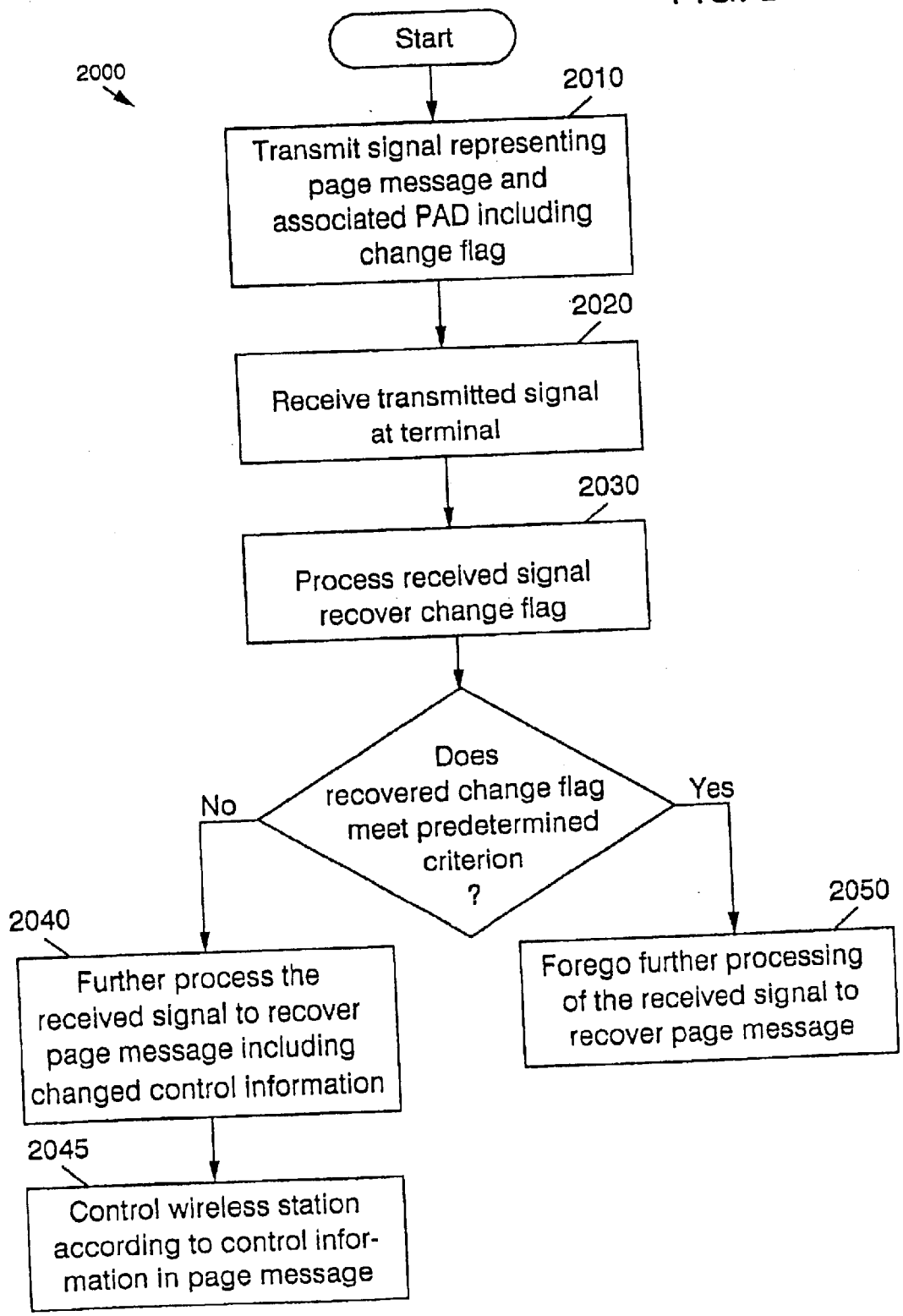

FIG. 20 illustrates operations 2000 according to another embodiment of the present invention, in which change flags are used to signal control information content in a page message. A signal representing a page message and an associated PAD that includes a flag, such as a flag associated with the GA, PCON, BCN, S-BCN or PFM values described above (or a flag representing a combination of multiple ones of these values), is transmitted over at least one DCCH or PCCH slot (Block 2010). The transmitted signal is received at a wireless station, such as the wireless station 400 of FIG. 4 (Block 2020). The received signal is processed to a sufficient extent to recover the change flag (Block 2030). If the recovered change flag indicates that a change has occurred that requires the receiving wireless station needs to recover the associated page message, the wireless station further processes the received signal to recover the page message (Block 2040) and the wireless station is then controlled based on the control information in the recovered page message (Block 2045). If not, the wireless station foregoes further processing, thus allowing the wireless station, for example, to go back to sleep and conserve energy (Block 2050).

FIG. 21 illustrates operations 2100 according to another embodiment of the present invention, in which an MRLQ functionality is provided by decoding a PAD channel carrier in CFSP field of PCH messages and using the resulting decoding metric in place of the normal CRC test performed under IS-136. An MRLQ counter is initialized, for example, upon a wireless station camping on a DCCH (Block 2110). The wireless station receives a PCH signal burst including a PAD in its CSFP field (Block 2120). The wireless station processes the signal burst to an extent sufficient to recover the CSFP field (Block 2130), and decodes the recovered CSFP field to recover the PAD and generate an accompanying decoding error estimate (Block 2140). If a decoding error is detected, the MRLQ counter is decremented (Block 2150). If no decoding error occurs, however, the MRLQ estimate is incremented, but no higher than a predetermined maximum value (Block 2160). If the MRLQ counter has not reached zero, the wireless station moves on to receive the next PCH burst (Block 2120), and repeats the subsequent operations described above. If the MRLQ counter has reached zero, however, the wireless station may declare a link failure and take further actions, such as seeking a new DCCH (Block 2170).

Figure 22A:
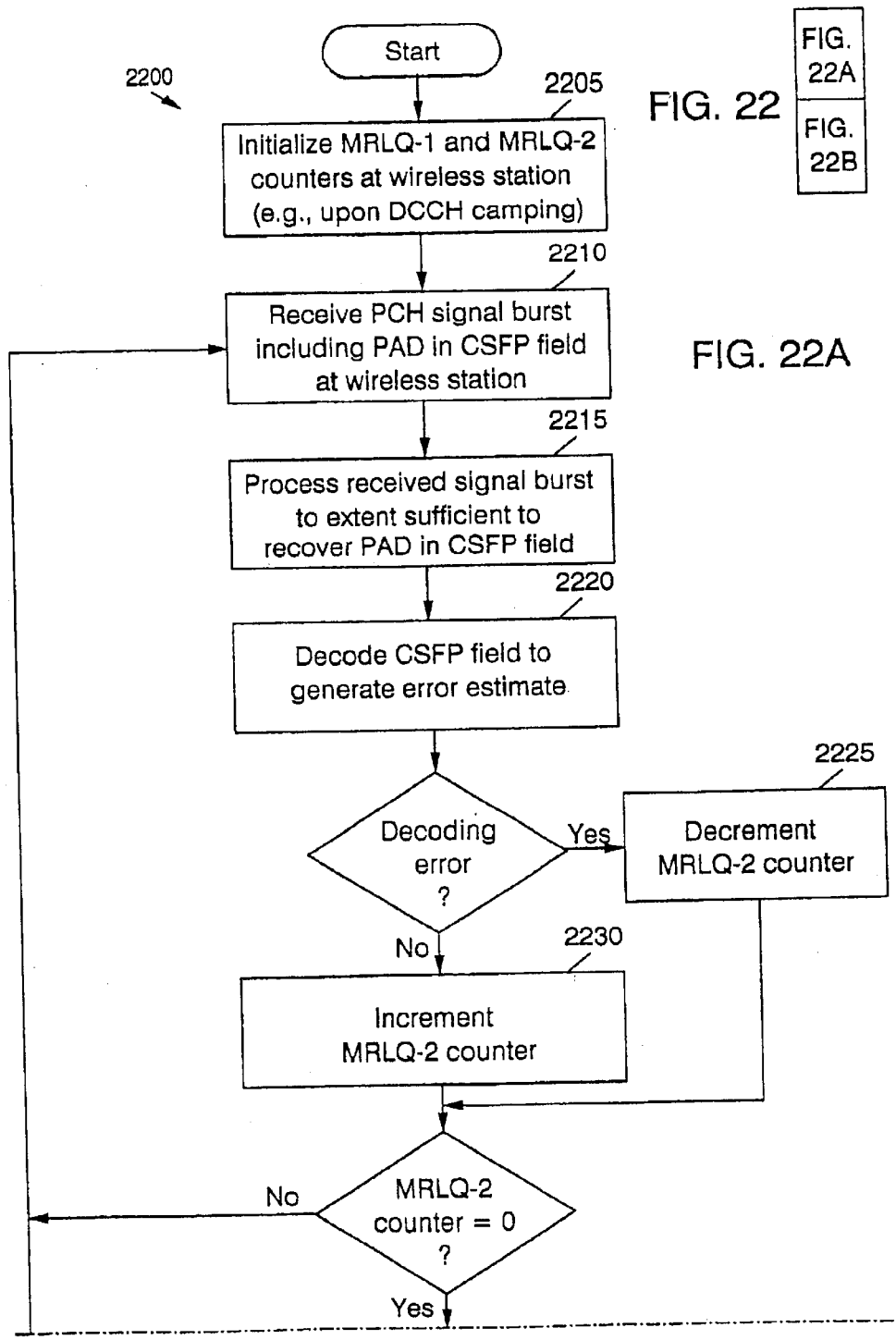
Figure 22B:
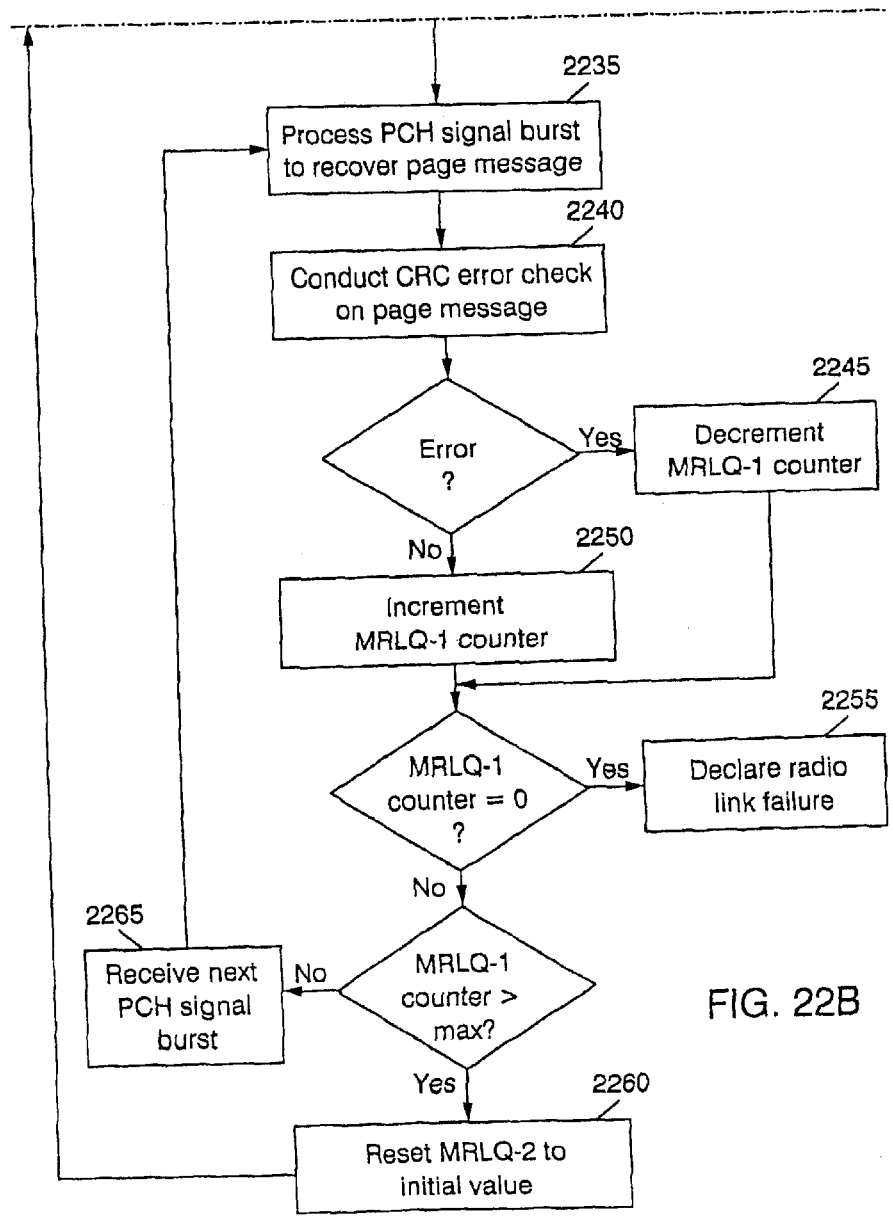

As described above and illustrated by the operations 2200 of the embodiment illustrated in FIG. 22, this MRLQ function may be modified to compensate for differences between the coding applied to the CSFP field and the CRC code normally used for MRLQ under IS-136. Referring to FIG. 22, a MRLQ-1 counter and a MRLQ-2 counter of a wireless station are initialized, e.g., upon the wireless station camping on a DCCH (Block 2205). The wireless station receives a PCH signal burst including a PAD in its CSFP field (Block 2210), and processes the received burst sufficiently to recover the CSFP field (Block 2215). The wireless station then decodes the CFSP field to recover the PAD and generate an accompanying error estimate (Block 2220). If a decoding error occurs, the MRLQ-2 counter is decremented (Block 2215). If no decoding error occurs, the MRLQ-2 counter is incremented (up to a maximum value) (Block 2230). If the MRLQ_2 counter has yet to reach zero, the wireless station goes on to receive the next PCH signal burst (Block 2210), and operations described above are repeated.

If the MRLQ-2 counter has reached zero, however, the wireless station further processes the received signal burst to recover the fully page message (Block 2235), and then conducts a CRC test on the recovered page message (Block 2240). If an error is present, the wireless station decrements the MRLQ-1 counter (Block 2245). If no error is detected, the wireless station increments the MRLQ-1 counter (Block 2250). If the MRLQ-1 counter has reached zero, the wireless station declares a link failure, and goes on to responsively perform related functions, such as attempting to acquire a new DCCH (Block 2255). If the MRLQ-1 counter has exceeded a predetermined value, however, the wireless station resets the MRLQ-2 counter (Block 2260) and returns to PAD-first recovery operations (Block 2210 et seq.). Otherwise, i.e., if the MRLQ-1 value is greater than zero but less than the predetermined value that triggers reset of the MRLQ-2 counter, the wireless station continues to receive PCH bursts, fully recover page messages therefrom and modify the MRLQ-1 counter accordingly (Blocks 2265 et seq.) until either a link failure is declared or the MRLQ-1 counter reaches a value sufficiently high to warrant reverting to PAD-first operation (Blocks 2210 et seq.).

Figure 23:
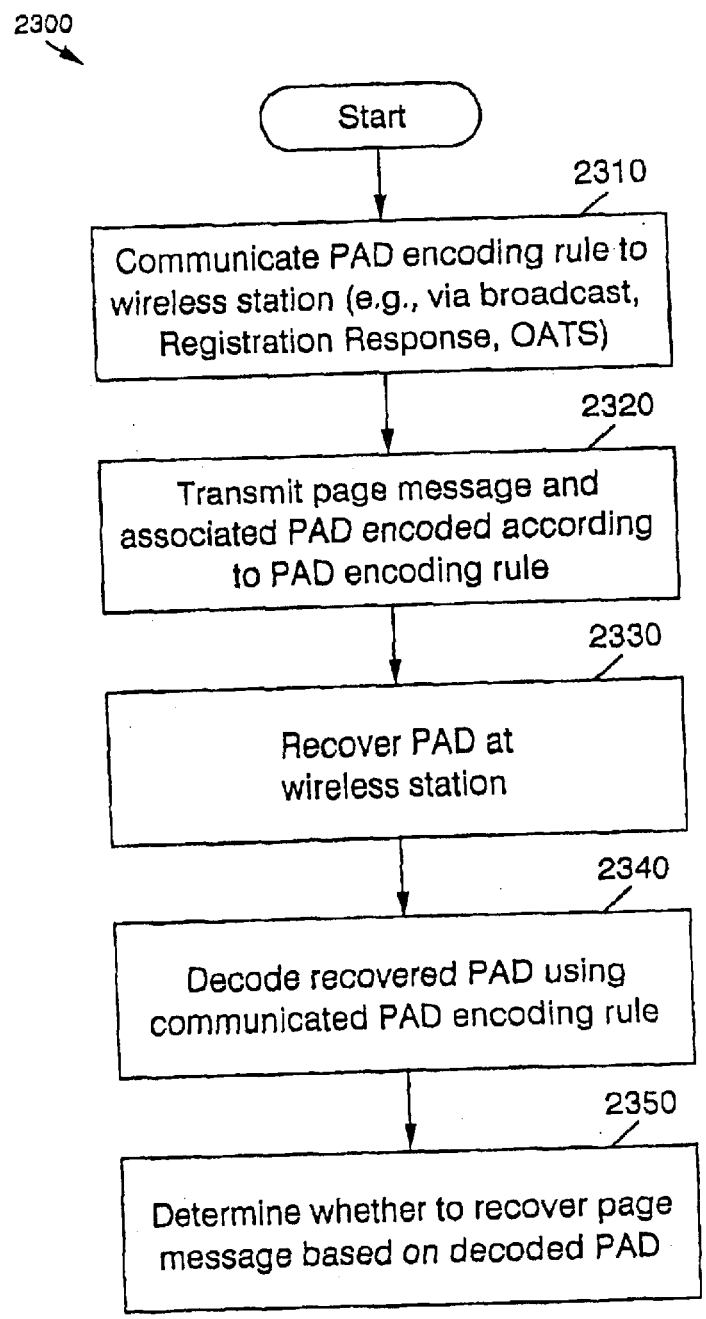

FIG. 23 illustrates exemplary operations 2300 according to another aspect of the present invention, in which interpretation of a recovered PAD is guided by an encoding rule (e.g., the rules described with reference to Tables 1–8) that is communicated to a wireless station. A PAD encoding rule is communicated to a wireless station, for example, over a broadcast channel, in a Registration Response message transmitted to the wireless station, or as part of an OATS procedure. (Block 2310). A page message and associated PAD are then transmitted (Block 2320), and the transmitted PAD is recovered at the wireless station (Block 2330). The recovered PAD is then decoded according to the previously communicated PAD encoding rule, e.g., according to one of the respective rules of Tables 1–8. (Block 2340). The wireless station then determines whether to recover the transmitted page message based on the decoded PAD (Block 2350).

FIG. 24 illustrates exemplary operations 2400 according to yet another aspect of the present invention, in which a wireless station may operate in either of a "PAD-enabled" mode in which the wireless station uses recovered PAD values to potentially reduce the number of page messages it decodes, and a "PAD-disabled" mode in which the wireless station recovers page messages irrespective of the associated PAD values, e.g., in a "normal" IS-136 fashion. A signal representing a page message and an associated PAD is transmitted (Block 2410). The signal is received at the wireless station (Block 2420). If the wireless station is in a PAD-enabled mode, it recovers the transmitted PAD and then determines whether to recover the transmitted page message based on the recovered PAD (Block 2430). If the wireless station is in the PAD-disabled mode, however, it recovers the page message irrespective of the PAD (Block 2440). It will be understood that recovering "irrespective of the PAD" does not preclude normal page message constraints, such as paging frame class limitations, and the like.

It will be appreciated that operations of FIGS. 17–24 are presented for illustrative purposes, and that the present invention encompasses operations beyond those illustrated in FIGS. 17–24. For example, the operations of FIG. 19 may be modified to eliminate the recovery of synchronization information, with blind synchronization techniques used instead to recover the PAD information. In addition, although the description of the operations of FIGS. 17–24 make reference to control channel structures along the line of those used in IS-136 compliant systems, the present invention may also find application within system complying with other standards, such as GSM.

In the drawings and specification, there have been disclosed typical preferred embodiments of the invention and, although specific terms are employed, they are used in a generic and descriptive sense only and not for purposes of limitation, the scope of the invention being set forth in the following claims

What is claimed is:

1. A method of communicating in a wireless communications system that is operative to communicate over a physical channel defined as a series of repeating time slots, the method comprising the steps of:
transmitting a paging attribute descriptor (PAD) in at least one of a first time slot of the physical channel and a second time slot of the physical channel succeeding the first time slot, the PAD indicating content of a page message;
transmitting the page message in the second time slot;
recovering the PAD at a wireless station; and
determining whether to recover the page message based on the recovered PAD;
wherein said step of transmitting a PAD comprises the step of transmitting a first signal representing the PAD in a time slot preceding a time slot assigned to a paging channel; and
wherein said step of transmitting a page message comprises the step of transmitting a second signal representing the page message in the time slot assigned to the paging channel;
wherein said step of receiving comprises the step of receiving the first and second signals at the wireless station; and
wherein said step of recovering the PAD comprises the step of recovering the PAD from the received first signal.

2. A method according to claim 1:
wherein said step of transmitting a PAD is preceded by the step of informing the wireless station if a PAD channel is enabled; and
wherein said step of recovering the PAD comprises the step of recovering the PAD responsive to the wireless station being informed that the PAD channel is enabled.

3. A method according to claim 1, further comprising the step of foregoing processing of the second signal to recover the page message if the recovered PAD meets a predetermined criterion.

4. A method according to claim 3:
wherein said step of transmitting a first signal comprises the step of transmitting a first signal burst representing the PAD in a time slot preceding a DCCH time slot assigned to a Paging Channel (PCH); and
wherein said step of transmitting a second signal comprises the step of transmitting a second signal burst representing the page message in the DCCH time slot assigned to the PCH.

5. A method according to claim 4:
wherein said step of transmitting a first signal comprises the step of transmitting a first signal burst representing a physical layer message that includes the PAD at an end portion thereof; and
wherein said step of recovering the PAD comprises the steps of:
receiving the transmitted first signal burst at the wireless station; and
demodulating the received first signal burst to an extent sufficient to recover the PAD without demodulating the entire first signal burst.

6. A method according to claim 4:
wherein said step of transmitting a second signal burst comprises the step of transmitting a second signal burst including a synchronization field at a beginning portion thereof;
wherein said step of recovering the PAD comprises the steps of:
receiving the first and second signal bursts at the wireless station:
demodulating the received second signal burst to an extent sufficient to recover the synchronization field without demodulating the entire second signal burst; and
processing the received first signal burst based on synchronization information in the recovered synchronization field to recover the PAD.

7. A method according to claim 1:
wherein said step of transmitting a PAD comprises the step of transmitting one of a plurality of group values, a respective one of the group values associated with a respective group of wireless stations;
wherein said step of recovering the PAD comprises the step of recovering a group value at the wireless station; and
wherein said step of determining comprises the step of electing to recover the page message if the recovered group value is associated with a group of wireless stations of which the wireless station is a member.

8. A method according to claim 1:
wherein said step of transmitting a PAD comprise the step of transmitting a PAD including a flag indicating status of control information included in the page message;
wherein said step of recovering the PAD comprises the step of recovering the flag at the wireless station; and
wherein said step of recovering the flag is followed by the step of controlling the wireless station based on the recovered flag.

9. A method according to claim 1, wherein said step of determining comprises the step of biasing a decision whether to recover the page message towards one of recovering the page message or foregoing recovery of the page message.

10. A method according to claim 1, further comprising one of the following steps:
recovering the transmitted page message at the wireless station if the PAD meets a predetermined criterion and the wireless station is in a first mode; or
recovering the transmitted page message irrespective of the recovered PAD if the wireless station is in a second mode.

11. A method of communicating in a wireless communications system that is operative to communicate over a physical channel defined as a series of repeating time slots, the method comprising the steps of:
transmitting a paging attribute descriptor (PAD) in at least one of a first time slot of the physical channel and a second time slot of the physical channel succeeding the first time slot, the PAD indicating content of a page message;
transmitting the page message in the second time slot;
recovering the PAD at a wireless station; and
determining whether to recover the page message based on the recovered PAD;
wherein said step of transmitting a PAD comprises the step of transmitting a PAD coded according to a first predetermined code;
wherein said step of recovering the PAD comprises the steps of:
receiving a signal at the wireless station; and
processing the received signal to generate data corresponding to the coded PAD; and
wherein the method further comprises the steps of:
decoding the generated data according to the first predetermined code to generate an estimate of the transmitted PAD;
generating an error estimate for the generated estimate of the transmitted PAD; and
determining link quality from the generated error estimate.

12. A method according to claim 11:
wherein said step of transmitting the page message comprises the step of transmitting the page message coded according to a second predetermined code;
wherein said step of determining link quality comprises the step of determining a first measure of link quality based on the generated error estimate for the estimate of the transmitted PAD; and
wherein the method further comprises the following steps, performed if the first measure of link quality meets a predetermined criterion:
recovering data corresponding to the page message at the wireless station;
decoding the recovered data corresponding to the page message according to the second predetermined code to generate an estimate of the page message;
generating an error estimate for the estimate of the page message; and
determining a second measure of link quality based on the generated error estimate for the estimate of the page message.

13. A method of operating a wireless station, the method comprising the steps of:
recovering a transmitted paging attribute descriptor (PAD) from at least one of a first time slot of a physical channel defined as a series of repeating time slots and a second time slot of the physical channel succeeding the first time slot, the PAD indicating content of a page message transmitted in the second time slot; and
determining whether to recover the page message based on the recovered PAD;
wherein said step of recovering a transmitted PAD comprises the steps of:
receiving a first signal burst representing a physical layer message that includes the PAD at an end portion thereof; and
demodulating the received first signal burst to an extent sufficient to recover the PAD without demodulating the entire first signal burst.

14. A method according to claim 13, further comprising one of the following steps:
recovering the page message if the recovered PAD meets a predetermined criterion; or
foregoing recovery of the page message if the recovered PAD fails to meet the predetermined criterion.

15. A method according to claim 13, wherein said step of recovering a transmitted PAD comprises the steps of:
receiving a signal at the wireless station; and
demodulating the received signal to an extent sufficient to recover the PAD.

16. A method according to claim 15, further comprising the step of foregoing further demodulation of the received signal if the recovered PAD meets a predetermined criterion.

17. A method according to claim 13:
wherein said step of recovering a transmitted PAD is preceded by the step of determining that a PAD channel is enabled; and
wherein said step of recovering a transmitted PAD comprises the step of recovering the PAD responsive to determining that the PAD channel is enabled.

18. A method according to claim 13:
wherein said step of recovering a transmitted PAD comprises the steps of:
receiving a first signal burst representing a physical layer message that includes the PAD at an end portion thereof;

receiving a second signal burst including a synchronization field at a beginning portion thereof;

demodulating the received second signal burst to an extent sufficient to recover the synchronization field without demodulating the entire second signal burst; and processing the received first signal burst based on synchronization information in the recovered synchronization field to recover the PAD.

19. A method according to claim 13:

wherein said step of recovering a transmitted PAD comprises the step of recovering a group value; and wherein said step of determining comprises the step of electing to recover the page message if the recovered group value is associated with a group of wireless stations of which the wireless station is a member.

20. A method according to claim 13:

wherein said step of recovering a transmitted PAD comprises the step of recovering the flag indicating status of control information included in the page message; and wherein said step of determining comprises the step of determining whether to recover the page message based on the recovered flag.

21. A method according to claim 13, wherein said step of determining comprises the step of biasing a decision whether to recover the page message towards one of recovering the page message or foregoing recovery of the page message.

22. A method according to claim 21, wherein said step of biasing comprises the step of biasing the decision whether to recover the page message based on at least one of channel quality and accuracy in recovering a previously transmitted PAD.

23. A method according to claim 13, further comprising one of the following steps:

recovering the transmitted page message at the wireless station if the recovered PAD meets a predetermined criterion and the wireless station is in a first mode; or recovering the transmitted page message irrespective of the recovered PAD if the wireless station is in a second mode.

24. A method of operating a wireless station, the method comprising the steps of:

recovering a transmitted paging attribute descriptor (PAD) from at least one of a first time slot of a physical channel defined as a series of repeating time slots and a second time slot of the physical channel succeeding the first time slot, the PAD indicating content of a page message transmitted in the second time slot; and determining whether to recover the page message based on the recovered PAD;

wherein said step of recovering a transmitted PAD comprises the steps of:

receiving a signal at the wireless station; and processing the received signal to generate data corresponding to the PAD; and wherein the method further comprises the steps of:

decoding the generated data according to a first predetermined code to generate an estimate of the transmitted PAD;

generating an error estimate for the generated estimate of the transmitted PAD; and determining link quality from the generated error estimate.

25. A method according to claim 24:

wherein said step of determining link quality comprises the step of determining a first measure of link quality based on the generated error estimate for the estimate of the transmitted PAD; and wherein the method further comprises the following steps, performed if the first measure of link quality meets a predetermined criterion:

recovering data corresponding to the page message at the wireless station;

decoding the recovered data corresponding to the page message according to a second predetermined code to generate an estimate of the page message;

generating an error estimate for the estimate of the page message; and determining a second measure of link quality based on the generated error estimate for the estimate of the page message.

26. A wireless station, comprising:

a receiver that recovers a transmitted paging attribute descriptor (PAD) from at least one of a first time slot of a physical channel defined as a series of repeating time slots and a second time slot of the physical channel succeeding the first time slot, the PAD indicating content of a page message transmitted in the second time slot, and that determines whether to recover the page message based on the recovered PAD, wherein the receiver is operative to receive a first signal burst representing a physical layer message that includes the PAD at an end portion thereof, to receive a second signal burst including a synchronization field at a beginning portion thereof, to demodulate the received second signal burst to an extent sufficient to recover the synchronization field without demodulating the entire second signal burst, and to process the received first signal burst based on synchronization information in the recovered synchronization field to recover the PAD.

27. A wireless station according to claim 26, wherein the wireless station is operative to determining whether to recover the page message based on a flag in the recovered PAD that indicates status of control information in the transmitted page message.

28. A wireless station according to claim 26, wherein the receiver is operative to bias a decision whether to recover the page message towards one of recovering the page message or foregoing recovery of the page message.

29. A wireless station according to claim 28, wherein the receiver is operative to bias the decision whether to recover the page message based on at least one of channel quality and accuracy in recovering a previously transmitted PAD.

30. A wireless station according to claim 26, wherein the receiver is operative to recover the transmitted page message at the wireless station if the recovered PAD meets a predetermined criterion and the wireless station is in a first mode and to recovering the transmitted page message irrespective of the recovered PAD it the tireless station is in a second mode.

* * * * *